(12) United States Patent
Yamasaki et al.

(10) Patent No.: US 9,648,266 B2
(45) Date of Patent: May 9, 2017

(54) DRIVING METHOD FOR IMAGE PICKUP DEVICE, DRIVING METHOD FOR IMAGING SYSTEM, IMAGE PICKUP DEVICE, AND IMAGING SYSTEM

(71) Applicant: CANON KABUSHIKI KAISHA, Tokyo (JP)

(72) Inventors: Takahiro Yamasaki, Inzai (JP); Keisuke Ota, Tokyo (JP); Hiroki Hiyama, Sagamihara (JP); Yasuhiro Oguro, Tokyo (JP); Nobuhiro Takeda, Yokohama (JP); Satoshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 14/704,668

(22) Filed: May 5, 2015

(65) Prior Publication Data
US 2015/0326809 A1 Nov. 12, 2015

(30) Foreign Application Priority Data

May 8, 2014 (JP) .................... 2014-097148

(51) Int. Cl.
*H04N 5/335* (2011.01)
*H04N 5/378* (2011.01)
*H04N 5/3745* (2011.01)

(52) U.S. Cl.
CPC ........... *H04N 5/378* (2013.01); *H04N 5/3745* (2013.01); *H04N 5/37452* (2013.01)

(58) Field of Classification Search
CPC ... H04N 5/37452; H04N 5/3745; H04N 5/378
See application file for complete search history.

(56) References Cited

U.S. PATENT DOCUMENTS

| 5,600,696 | A | * | 2/1997 | Sauer ................ G11C 19/285 257/239 |
| 2005/0248666 | A1 | * | 11/2005 | Kim ...................... H04N 5/235 348/230.1 |
| 2009/0322903 | A1 | * | 12/2009 | Hashimoto ............ H04N 5/357 348/229.1 |
| 2011/0304757 | A1 | * | 12/2011 | Egawa ................... H04N 5/355 348/300 |
| 2012/0301050 | A1 | * | 11/2012 | Wakazono ......... H04N 5/23229 382/274 |
| 2013/0194469 | A1 | * | 8/2013 | Nakata ............... H04N 5/23245 348/300 |

(Continued)

FOREIGN PATENT DOCUMENTS

| JP | 2010-259027 A | 11/2010 |
| JP | 2013-211832 A | 10/2013 |

*Primary Examiner* — Lin Ye
*Assistant Examiner* — John H Morehead, III
(74) *Attorney, Agent, or Firm* — Canon USA, Inc. IP Division

(57) ABSTRACT

There are provided a driving method for an image pickup device, a driving method for an imaging system, an image pickup device, and an imaging system, which changes an operation for mixing signals generated by a plurality of pixels in accordance with an amplification factor of a signal processing circuit in the image pickup device or an amplification unit externally provided to the image pickup device.

19 Claims, 13 Drawing Sheets

(56) References Cited

U.S. PATENT DOCUMENTS

2014/0340554 A1\* 11/2014 Ishii ...................... H04N 5/343
                                                           348/302
2015/0319388 A1\* 11/2015 Ohshitanai ............ H04N 5/378
                                                           348/301

\* cited by examiner

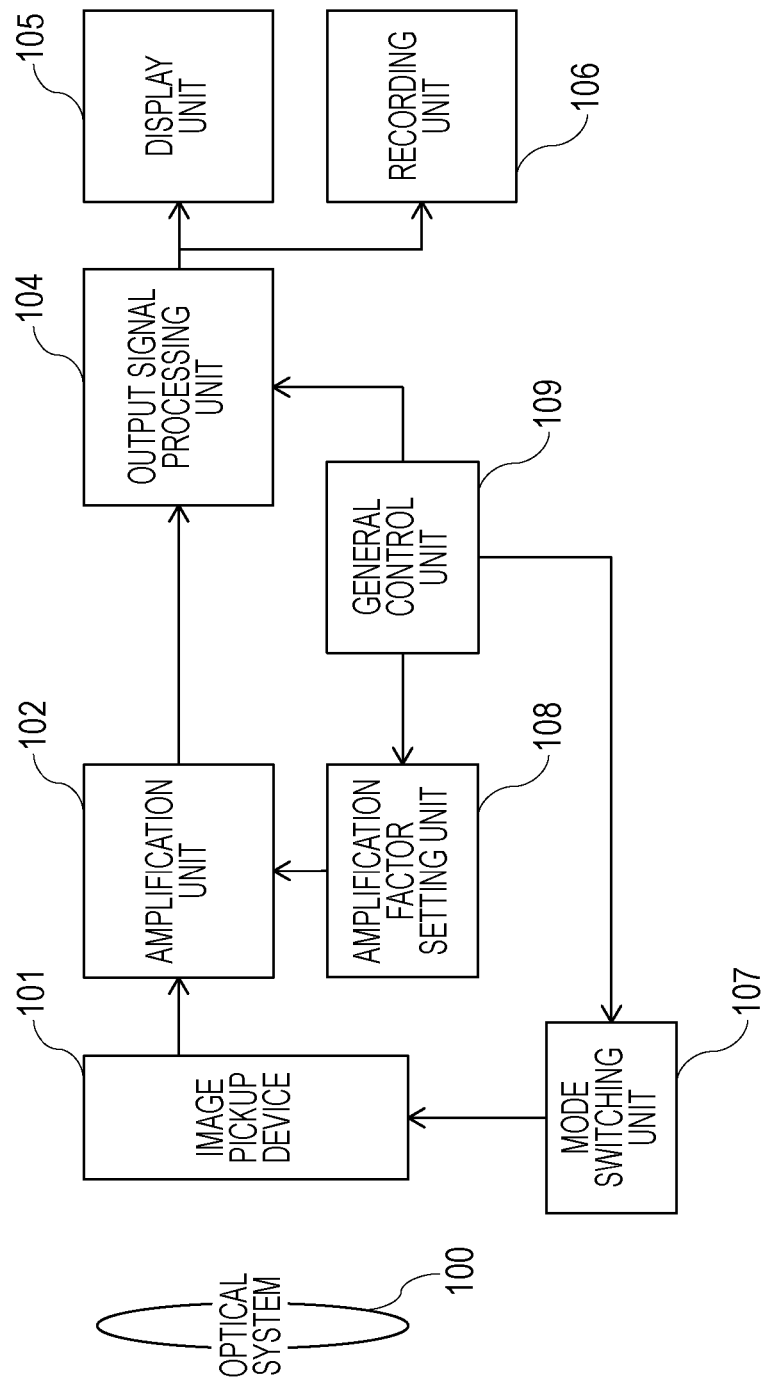

DRIVING METHOD FOR IMAGE PICKUP DEVICE, DRIVING METHOD FOR IMAGING SYSTEM, IMAGE PICKUP DEVICE, AND IMAGING SYSTEM

BACKGROUND

Technical Field

The present disclosure relates to a driving method for an image pickup device and a driving method for an imaging system.

Description of the Related Art

An image pickup device has been known which includes a plurality of pixels and a vertical signal line which receives signals from a plurality of pixels.

In an image pickup device according to Japanese Patent Laid-Open No. 2010-259027, each of a plurality of pixels has a photoelectric conversion unit, a floating diffusion (hereinafter, called an FD unit) which accumulates electric carriers generated by the photoelectric conversion unit, and an amplifying transistor which outputs a signal according to voltage in the FD unit. Each of the plurality of pixels further has a selection transistor which switches between a conductive state and a non-conductive state between the amplifying transistor and the vertical signal line.

In the image pickup device according to Japanese Patent Laid-Open No. 2010-259027, a current source is connected to the vertical signal line, and electric current is supplied to an amplifying transistor in pixels in conduction brought by a selection transistor. An amplifying transistor has a main node which is different from a main node connected to the selection transistor and receives supply of voltage from a voltage source. When the selection transistor is brought into conduction, a current source, an amplifying transistor and a voltage source configure a source follower circuit.

A plurality of pixels are arranged across a plurality of rows and a plurality of columns. The image pickup device disclosed in Japanese Patent Laid-Open No. 2010-259027 performs a first operation which brings selection transistors in pixels of a plurality of rows into conduction in parallel and mixes signals output by amplifying transistors in the plurality of pixels in a vertical signal line. The image pickup device disclosed in Japanese Patent Laid-Open No. 2010-259027 further operates a second operation which sequentially brings selection transistors in the pixels of each of the rows. Thus, the amplifying transistors of the pixels output.

Japanese Patent Laid-Open No. 2013-211832 discloses a configuration having a column signal processing circuits provided for each of a plurality of columns of pixels. The column signal processing circuit outputs a signal acquired by amplifying in accordance with an amplification factor a signal output from the corresponding pixel to the vertical signal line.

As a difference between signals output by a plurality of amplifying transistors increases, the accuracy of signal acquired as a result of the first operation decreases. Under some imaging condition, a difference between signals to be mixed may easily increase. Both of Japanese Patent Laid-Open No. 2010-259027 and Japanese Patent Laid-Open No. 2013-211832 do not consider an operation in a case where a difference between signals to be mixed is large.

SUMMARY

According to an aspect of the present invention, a driving method for an image pickup device having a plurality of pixels, a vertical signal line, and a signal processing circuit, the plurality of pixels having a first pixel and a second pixel, the first pixel having a first photoelectric conversion unit and a first amplifying transistor, the second pixel having a second photoelectric conversion unit, and a second amplifying transistor includes amplifying a signal output to the vertical signal line with one of a first amplification factor and a second amplification factor lower than the first amplification factor by the signal processing circuit, performing a first operation if the signal processing circuit amplifies the signal output to the vertical signal line with the first amplification factor, and performing a second operation without performing the first operation if the signal processing circuit amplifies the signal output to the vertical signal line with the second amplification factor. In this case, the first operation includes an operation in which a first signal and a second signal are mixed in the vertical signal line by at least partially overlapping a period when the first amplifying transistor outputs the first signal based on electric carriers generated by the first photoelectric conversion unit to the vertical signal line with a period when the second amplifying transistor outputs the second signal based on electric carriers generated by the second photoelectric conversion unit to the vertical signal line, and the second operation includes an operation in which the image pickup device outputs a plurality of signals based on electric carriers acquired by performing photoelectric conversion on incident light by reducing the number of signals to a number lower than the number of the plurality of pixel.

According to another aspect of the present invention, a driving method for an image pickup device having a plurality of pixels, a vertical signal line, and a signal processing circuit, the plurality of pixels having a first pixel and a second pixel, the first pixel having a first photoelectric conversion unit, a first capacitative element, a first floating diffusion, and a first amplifying transistor, the second pixel having a second photoelectric conversion unit, a second capacitative element, a second floating diffusion, and a second amplifying transistor, includes amplifying a signal output to the vertical signal line with one of a first amplification factor and a second amplification factor lower than the first amplification factor by the signal processing circuit, performing a first operation if the signal processing circuit amplifies the signal output to the vertical signal line with the first amplification factor, and performing a second operation without performing the first operation if the signal processing circuit amplifies the signal output to the vertical signal line with the second amplification factor. In this case, the first operation is an operation in which electric carriers generated by the first photoelectric conversion unit are held in the first floating diffusion without being held in the first capacitative element. Electric carriers generated by the second photoelectric conversion unit are held in the second floating diffusion without being held in the second capacitative element. A first signal and a second signal are mixed in the vertical signal line by at least partially overlapping a period when the first amplifying transistor outputs the first signal based on a potential of the first floating diffusion to the vertical signal line and a period when the second amplifying transistor outputs the second signal based on a potential of the second floating diffusion to the vertical signal line. The second operation is an operation in which electric carriers generated by the first photoelectric conversion unit are held in a first added capacitance of the first capacitative element and the first floating diffusion. Electric carriers generated by the second photoelectric conversion unit are held in a second added capacitance of the second capacitative element and the second floating diffusion. The first signal and the second signal are mixed in the vertical signal line by at least partially overlapping a period when the first amplifying transistor outputs the first signal based on a potential of the first floating diffusion to the vertical signal line and a period when the second amplifying transistor outputs the second signal based on a potential of the second floating diffusion to the vertical signal line.

According to another aspect of the present invention, there is provided a driving method for an imaging system having an image pickup device having a plurality of pixels and a vertical signal line, the plurality of pixels having a first pixel and a second pixel, the first pixel having a first photoelectric conversion unit and a first amplifying transistor, and the second pixel, having a second photoelectric conversion unit and a second amplifying transistor, and a control unit which controls the image pickup device, the image pickup device performing a first operation if the control unit sets a first sensitivity, and the image pickup device performing a second operation without performing the first operation if the control unit sets a second sensitivity lower than the first sensitivity. In this case, the first operation is an operation in which a first signal and a second signal are mixed in the vertical signal line by at least partially overlapping a period when the first amplifying transistor outputs the first signal based on electric carriers generated by the first photoelectric conversion unit to the vertical signal line with a period when the second amplifying transistor outputs the second signal based on electric carriers generated by the second photoelectric conversion unit to the vertical signal line. The second operation is an operation in which the image pickup device outputs signals based on electric carriers acquired by performing photoelectric conversion on incident light by reducing the number of signals to a number lower than the number of the plurality of pixel by applying a method different from the first operation.

According to another aspect of the present invention, a driving method for an imaging system having an image pickup device having a plurality of pixels and a vertical signal line, the plurality of pixel having a first pixel and a second pixel, the first pixel having a first photoelectric conversion unit and a first amplifying transistor, the second pixel having a second photoelectric conversion unit and a second amplifying transistor, and an amplification unit which is provided on a different semiconductor substrate from that of the image pickup device and amplifies a signal output from the image pickup device, includes amplifying a signal output from the image pickup device with a first amplification factor and a second amplification factor lower than the first amplification factor by the amplification unit, performing a first operation by the image pickup device if the amplification unit amplifies the signal output from the image pickup device with the first amplification factor, and performing a second operation without performing the first operation by the image pickup device if the amplification unit amplifies the signal output from the image pickup device with the second amplification factor. In this case, the first operation is an operation in which a first signal and a second signal are mixed in the vertical signal line by at least partially overlapping a period when the first amplifying transistor outputs the first signal based on electric carriers generated by the first photoelectric conversion unit to the vertical signal line with a period when the second amplifying transistor outputs the second signal based on electric carriers generated by the second photoelectric conversion unit to the vertical signal line. The second operation is an operation in which the image pickup device outputs signals based on electric carriers acquired by performing photoelectric conversion on incident light by reducing the number of signals to a number lower than the number of the plurality of pixels by a method different from the first operation.

Further features of the present invention will become apparent from the following description of exemplary embodiments with reference to the attached drawings.

BRIEF DESCRIPTION OF THE DRAWINGS

FIG. 13 illustrates an example of a configuration of an imaging system.

DESCRIPTION OF THE EMBODIMENTS

An image pickup device according to exemplary embodiments will be described below with reference to drawings.

First Exemplary Embodiment

Figure 1:
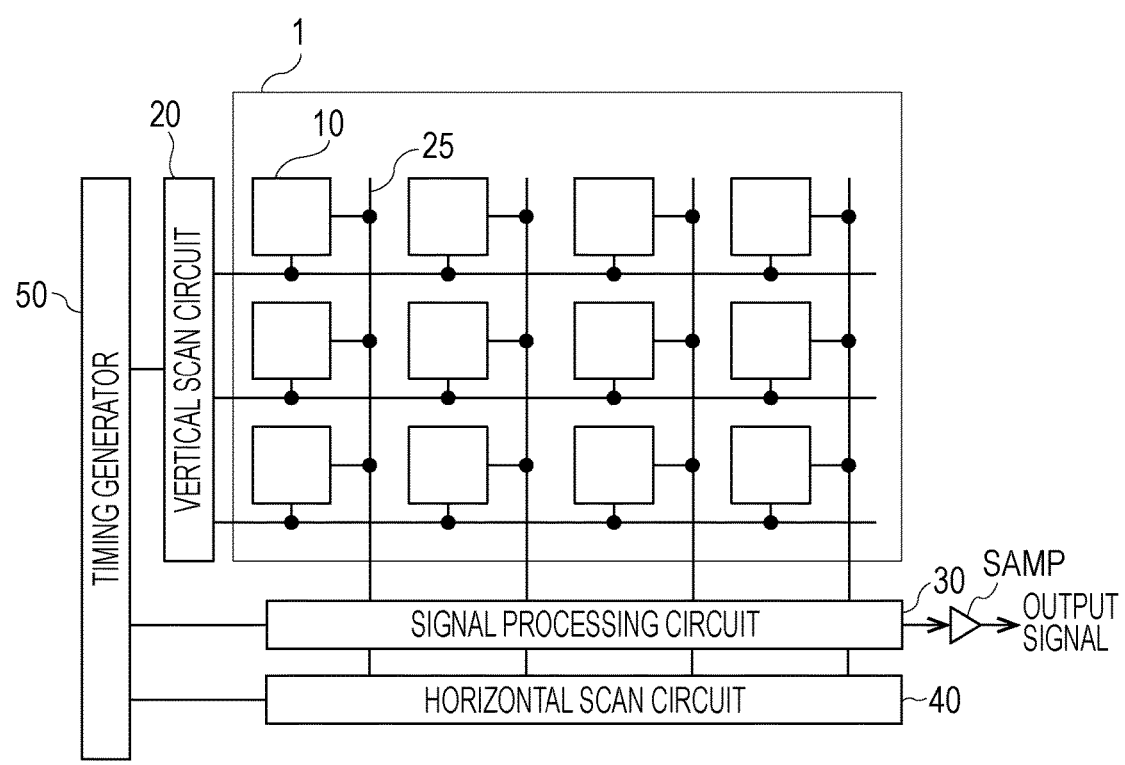
FIG. 1 illustrates an example of a configuration of an image pickup device.

FIG. 1 illustrates a configuration of an image pickup device according to a first exemplary embodiment.

The image pickup device includes a pixel array 1 having a plurality of pixels 10 arranged in a plurality of rows and a plurality of columns. The image pickup device further includes a vertical scan circuit 20 configured to vertically scan the pixels 10 row by row. The image pickup device further includes a plurality of vertical signal lines 25 each provided for a column of the pixels 10. The image pickup device further has a plurality of signal processing circuits 30. While each of the plurality of signal processing circuits 30 is provided correspondingly for the vertical signal line 25 of each column, FIG. 1 illustrate the signal processing circuits 30 of a plurality of columns as one signal processing circuit 30 block. The image pickup device further includes a horizontal scan circuit 40. The horizontal scan circuit 40 horizontally scans the signal processing circuits 30 of each column. The image pickup device further has a timing generator 50 configured to control operations of the vertical scan circuit 20, signal processing circuit 30, and horizontal scan circuit 40. The image pickup device further has an amplifier SAMP. The amplifier SAMP amplifies signals output from the signal processing circuit 30 of each of the columns and outputs the amplified signals as output signals externally to the image pickup device.

Figure 2:
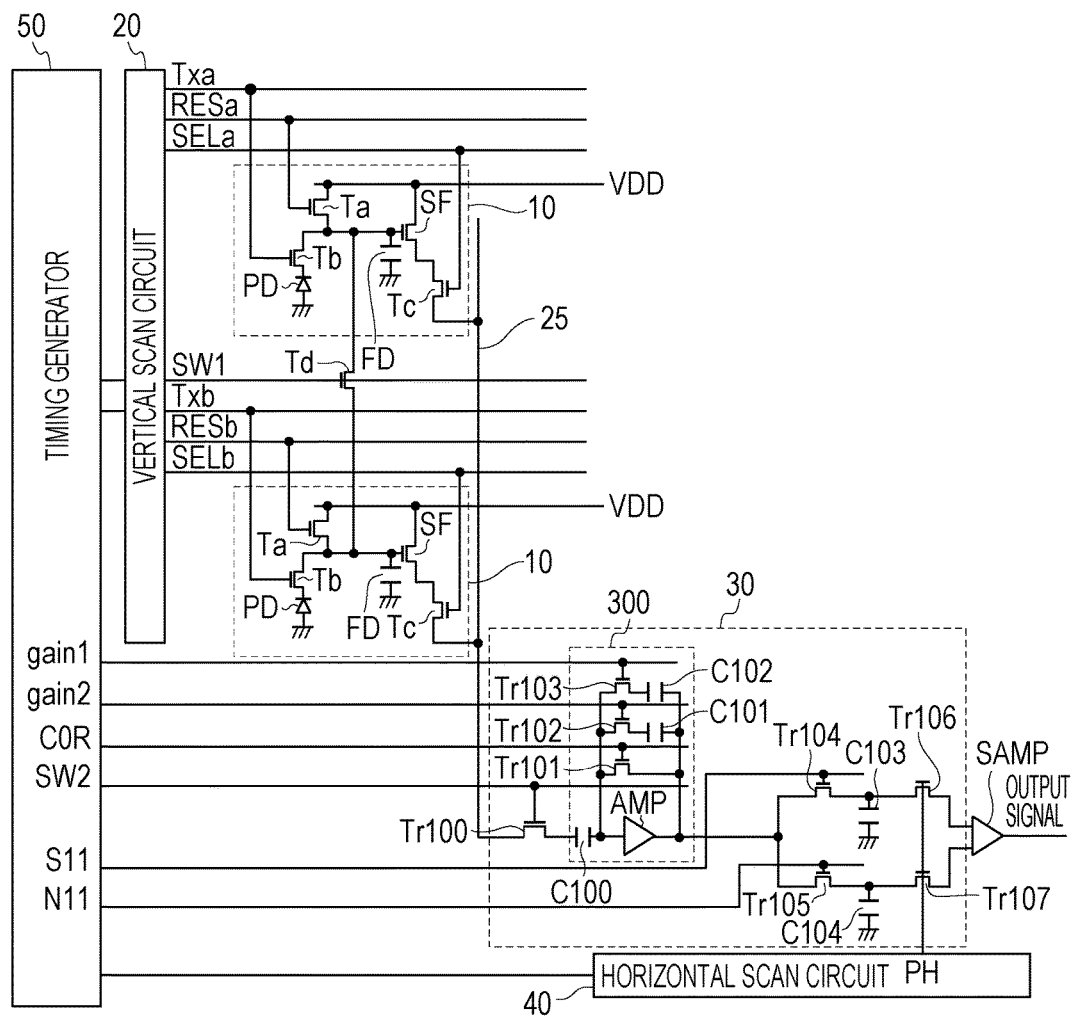
FIG. 2 illustrates an example of a configuration of an image pickup device.

FIG. 2 illustrates the circuits associated with the pixels 10 of two rows and one column out of the image pickup device in FIG. 1.

Each of the pixels 10 has a photoelectric conversion unit PD, a transistor Ta, a transistor Tb, a transistor Tc, a transistor SF, and a floating diffusion FD. The photoelectric conversion unit PD generates electric carriers based on incident light. The pixel array 1 illustrated in FIG. 1 has a transistor Td which electrically connects between the floating diffusions FD of the pixels 10 of different rows. A source follower circuit includes the transistor SF, a current source, not illustrated, which supplies electric current to the vertical signal line, and a power supply voltage VDD to be fed to one main node of the transistor SF. The transistor SF provided in each of the pixels 10 is an amplifying transistor which outputs a signal based on electric carriers in the photoelectric conversion unit PD.

The vertical scan circuit 20 outputs a signal RESa, a signal Txa, and a signal SELa to the transistor Ta, transistor Tb, and transistor Tc, respectively, of each of the pixels 10 of a first row. The vertical scan circuit 20 further outputs a signal RESb, a signal Txb, and a signal SELb to the transistor Ta, transistor Tb, and transistor Tc, respectively, of each of the pixels 10 of a second row.

The signal processing circuit 30 has a transistor Tr 100, a transistor Tr 104, a transistor Tr 105, a transistor Tr 106, a transistor Tr 107, a capacitative element C103, a capacitative element C104, and a differential amplifier circuit 300. The differential amplifier circuit 300 has a capacitative element C100, an amplifier AMP, a transistor Tr 101, a transistor Tr 102, a transistor Tr 103, a capacitative element C101, and a capacitative element C102. The capacitative element C102 has a capacitance value lower than a capacitance value of the capacitative element C101.

The horizontal scan circuit 40 outputs a signal PH to the transistor Tr 106 and transistor Tr 107 in the signal processing circuit 30. A signal gain1, a signal gain2, a signal COR, a signal SW2, a signal S11, and a signal N11 are output from the timing generator 50 to the other transistors Tr in the signal processing circuit 30.

In the image pickup device according to this exemplary embodiment, a control unit externally provided to the image pickup device sets an amplification factor of the differential amplifier circuit 300. More specifically, in the image pickup device of this exemplary embodiment, when a higher sensitivity (such as an ISO sensitivity) is set, a first amplification factor is set as the amplification factor of the differential amplifier circuit 300. When a low sensitivity is set, a second amplification factor lower than the first amplification factor is set as the amplification factor of the differential amplifier circuit 300. The control unit may be provided in the image pickup device.

A first operation of the image pickup device will be described mainly. The first operation refers to an operation to be performed by the differential amplifier circuit 300 for amplifying, with the first amplification factor, signals output from the pixels 10 to the vertical signal line 25 by using the capacitative element C100 and capacitative element C102. A second operation of the image pickup device illustrated in FIG. 4, which will be described below, refers to an operation to be performed by the differential amplifier circuit 300 for amplifying, with the second amplification factor lower than the first amplification factor, signals output from the pixels 10 to the vertical signal line 25 by using the capacitative element C100 and capacitative element C101.

Next, the first operation to be performed by the image pickup device illustrated in FIG. 2 will mainly be described with reference to FIG. 3. The signals illustrated in FIG. 3 correspond to the signals illustrated in FIG. 2. The first operation, which will be described below, includes transferring electric carriers generated by the photoelectric conversion units PD in the plurality of pixels 10 to the corresponding floating diffusions FD. The first operation further includes then turning on the transistors Tc in the plurality of pixels 10 simultaneously and mixing in the vertical signal line 25 the signals output from the transistors SF in the plurality of pixels 10.

At a time before a time t1, the vertical scan circuit 20, horizontal scan circuit 40, and timing generator 50 output the signals, illustrated in FIG. 2, each having a Low level (hereinafter, called an L level).

At the time t1, the timing generator 50 changes the signal SW2 to a High level (hereinafter, called an H level). Thus, an electrical path between the vertical signal line 15 and the capacitative element C100 is brought into conduction.

At a time t2, the vertical scan circuit 20 changes the signal RESa and signal RESb to an H level). This resets potentials of the floating diffusions FD for the pixels 10 of the first row and the floating diffusions FD of the pixels 10 of the second row.

At a time t3, the vertical scan circuit 20 changes the signal Txa and signal Txb to an H level. This resets electric carriers in the photoelectric conversion units PD in the pixels 10 of the first row and electric carriers in the photoelectric conversion unit PD in the pixels 10 of the second row.

At a time t4, the vertical scan circuit 20 changes the signal Txa and signal Txb to an L level.

At a time t5, the timing generator 50 changes the signal COR to an H level. This resets electric carriers in the capacitative element C100, capacitative element C101, and capacitative element C102. At the time t5, the vertical scan circuit 20 changes the signal SELa and signal SELb to an H level. Thus, the potential of the vertical signal line 25 becomes equal to the potential of a signal acquired by mixing signals output from the transistors SF in the pixels 10 of the first row and signals output from the transistors SF in the pixels 10 of the second row. Hereinafter, the signal acquired by mixing signals output from the transistors SF in the pixels 10 of the first row and signals output from the transistors SF in the pixels 10 of the second row will be called an SFNMix signal. The signals output from the transistors SF in the pixels 10 of the first row are noise signals based on the reset potential of the floating diffusions FD. Signals output from the transistors SF in the pixels 10 of the second row are noise signals based on the reset potential of the floating diffusions FD.

At a time t6, the timing generator 50 changes the signal COR to an L level. Thus, the capacitative element C100 holds the SFNMix signal. At the time t6, the vertical scan circuit 20 changes the signal RESa and signal RESb to an L level. This cancels the reset of the floating diffusions FD for the pixels 10 of the first row and the floating diffusions FD for the pixels 10 of the second row.

At a time t7, the timing generator 50 changes the signal gain1 to an H level. Thus, the differential amplifier circuit 300 outputs a signal acquired by amplifying, with the first amplification factor, a signal input from the vertical signal line 25 through the capacitative element C100. The timing generator 50 changes the signal N11 to an H level. This brings the electrical path between the differential amplifier circuit 300 and the capacitative element C104 into conduction. After that, the timing generator 50 changes the signal N11 to an L level. Thus, the capacitative element C104 holds the signal output by the differential amplifier circuit 300. The signal held in the capacitative element C104 is a noise signal mainly containing an offset component of the differential amplifier circuit 300.

At a time t8, vertical scan circuit 20 changes the signal TXa and signal TXb to an H level. Thus, electric carriers generated by the photoelectric conversion units PD in the pixels 10 of the first row are transferred to the floating diffusion FD for the pixels 10. Thus, electric carriers generated by the photoelectric conversion units PD in the pixels 10 of the second row are transferred to the floating diffusion FD for the pixels 10. After that, the vertical scan circuit 20 changes the signal TXa and signal TXb to an L level. Thus the transistors SF in the pixels 10 of the first row output signals based on the electric carriers generated by the photoelectric conversion units PD in the pixels 10 of the first row. The transistors SF in the pixels 10 of the second row output signals based on electric carriers generated by the photoelectric conversion units PD in the pixels 10 of the second row. The potential of the vertical signal line 25 becomes equal to the potential of a signal acquired by mixing signals output from the transistors SF in the pixels 10 of the first row and signals output from the transistors SF in the pixels 10 of the second row. Hereinafter, the signal acquired by mixing signals output from the transistors SF in the pixels 10 of the first row and signals output from the transistors SF in the pixels 10 of the second row will be called an SFSMix signal. The differential amplifier circuit 300 receives a signal acquired by subtracting the SFNMix signal held in the capacitative element C100 from the SFSMix signal. The differential amplifier circuit 300 outputs a signal acquired by amplifying the SFSMix signal with the first amplification factor.

At a time t9, the timing generator 50 changes the signal S11 to an H level. This brings the electrical path between the capacitative element C103 and the differential amplifier circuit 300 into conduction. After that, the timing generator 50 changes the signal S11 to an L level. Thus, the capacitative element C103 holds a signal acquired by amplifying the SFSMix signal with the first amplification factor by the differential amplifier circuit 300.

At a time t10, the timing generator 50 changes the signal SW2 to an L level. This brings the electrical path between the pixels 10 and the capacitative element C100 into nonconduction. The horizontal scan circuit 40 at the time t10 changes the signal PH to an H level. Thus, a signal acquired by amplifying the SFSMix signal, with the first amplification factor, held in the capacitative element C103 and the noise signal held in the capacitative element C104 to the amplifier SAMP. The amplifier SAMP outputs externally to the image pickup device a signal acquired by amplifying a difference between the signal acquired by amplifying the SFSMix signal with the first amplification factor and the noise signal.

Next, the second operation to be performed by the image pickup device illustrated in FIG. 2 will mainly be described with reference to FIG. 4. The signals illustrated in FIG. 4 correspond to the signals illustrated in FIG. 2. The second operation, which will be described below, includes an operation for acquiring mixed electric carriers by mixing electric carriers generated by a plurality of photoelectric conversion units PD as a result of electrical connection of a plurality of floating diffusions FD. The second operation further includes an operation to be performed by the transistor SF in each of the pixels 10 for outputting a signal based on mixed electric carriers acquired by electrically connecting a plurality of floating diffusions FD to the vertical signal line 25. Differences from the first operation described with reference to FIG. 3 will mainly be described below.

Figure 3:
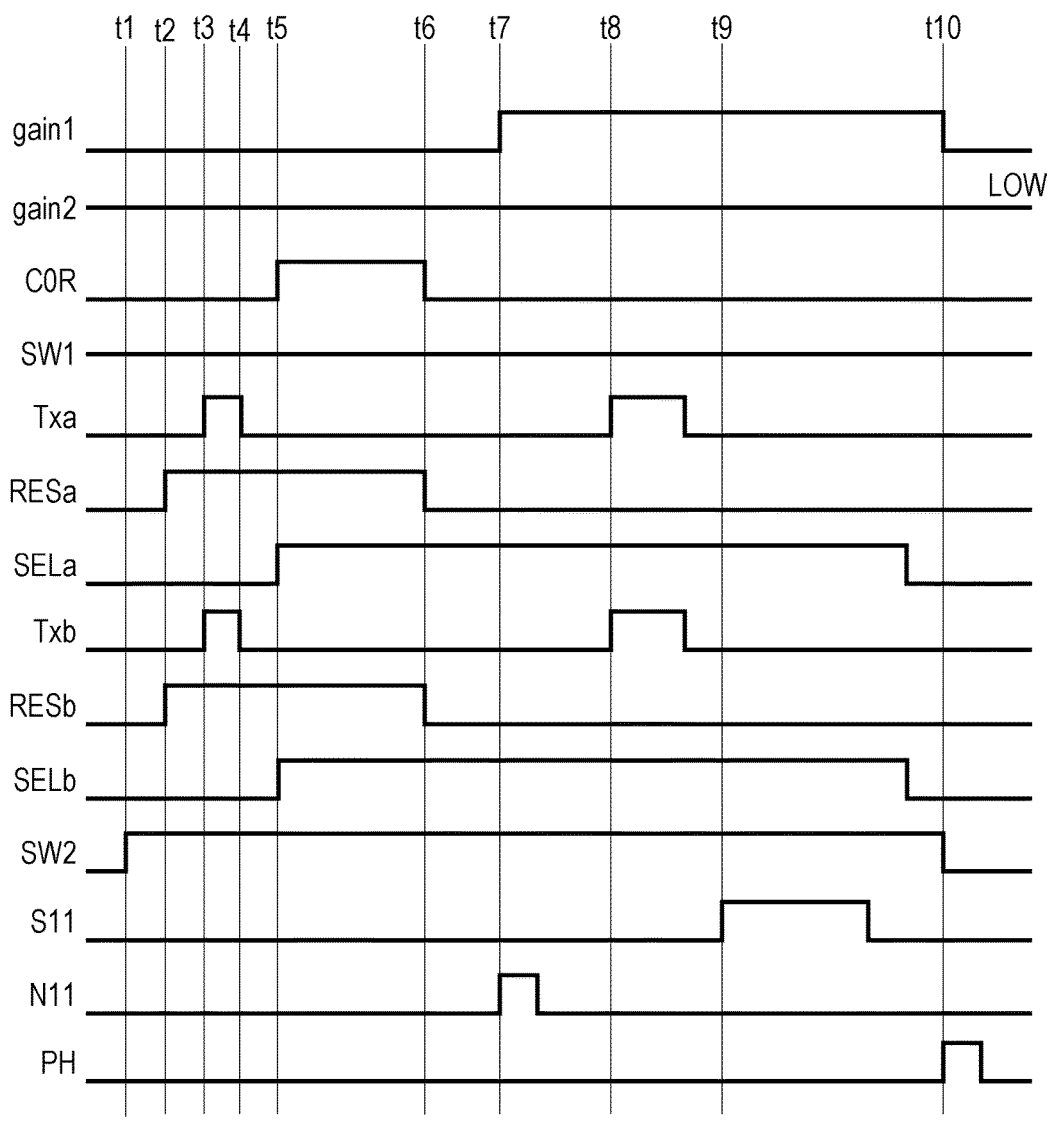
FIG. 3 illustrates an example of an operation of an image pickup device.
Figure 4:
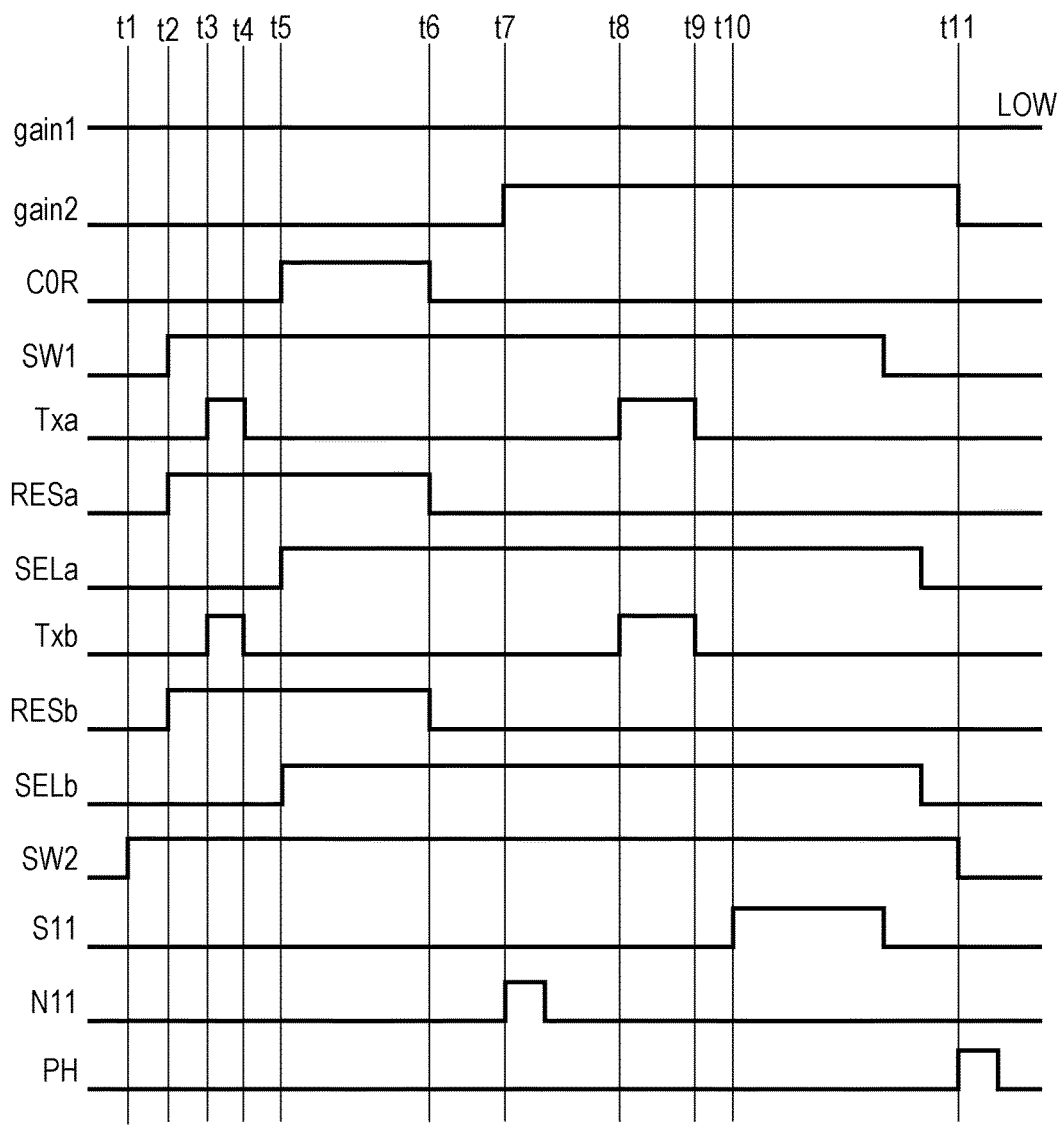
FIG. 4 illustrates an example of an operation of an image pickup device.

The operation at a time t1 illustrated in FIG. 4 is the same as the operation at the time t1 illustrated in FIG. 3.

At a time t2, the timing generator 50 changes the signal SW1 to an H level. Thus, the floating diffusions FD for the pixels 10 of the first row and the floating diffusions FD for the pixels 10 of the second row illustrated in FIG. 2 are electrically connected.

The operations from a time t3 to a time t6 are the same as the operations from the time t3 to the time t6 illustrated in FIG. 3.

At the time t7 illustrated in FIG. 3, the timing generator 50 changes the signal gain1 to an H level and the signal gain2 to an L level. On the other hand, at a time t7 illustrated in FIG. 4, the timing generator 50 changes the signal gain1 to an L level and the signal gain2 to an H level. The amplification factor of the differential amplifier circuit 300 is represented as a capacitance value of the capacitative element C100/a capacitance value of a feedback capacitance. As described above, the capacitance value of the capacitative element C102 is lower than the capacitance value of the capacitative element C101. Therefore, the amplification factor of the differential amplifier circuit 300 is set to the second amplification factor lower than the first amplification factor set in the operation in FIG. 3.

The operations from the time t7 to a time t8 illustrated in FIG. 4 are the same as the operations from the time t7 to the time t8 illustrated in FIG. 3. At the time t8, the vertical scan circuit 20 changes the signal TXa and signal TXb to an H level so that electric carriers generated by the photoelectric conversion units PD in the pixels 10 of the first row and second row are mixed in the floating diffusions FD which are electrically connected with each other. The potential of an input node electrically connected to the floating diffusions FD of the transistors SF in the pixels 10 of the first row is equal to the potential of an input node electrically connected to the floating diffusions FD of the transistors SF in the pixels 10 of the second row. Each of the transistors SF in the pixels 10 of the first row and second row outputs a signal based on electric carriers mixed by the plurality of floating diffusions FD to the vertical signal line 25 through the corresponding transistor Tc. This signal will be called an FDMix signal. The differential amplifier circuit 300 outputs a signal acquired by amplifying the FDMix signal with the second amplification factor.

At a time t10, the timing generator 50 changes the signal S11 to an H level. Thus, the capacitative element C103 holds a signal acquired by amplifying the FDMix signal by the differential amplifier circuit 300.

At a time t11, the horizontal scan circuit 40 changes the signal PH to an H level. Thus, a signal acquired by amplifying an FDSMix signal with the second amplification factor, which is held in the capacitative element C103, and a noise signal held in the capacitative element C104 are output to the amplifier SAMP. The amplifier SAMP outputs externally to the image pickup device a signal acquired by amplifying a difference between a signal acquired by amplifying the FDMix signal with the first amplification factor and the noise signal. As described above, the second operation outputs signals based on electric carriers acquired by performing photoelectric conversion on incident light and output by the image pickup device by reducing the number of signals lower than a total of the plurality of pixel 10.

Thus, the image pickup device of this exemplary embodiment performs the first operation if the amplification factor of the differential amplifier circuit 300 is the first amplification factor. If the amplification factor of the differential amplifier circuit 300 is the second amplification factor lower than the first amplification factor, the image pickup device of this exemplary embodiment performs the second operation.

In the first operation, as the difference in signal amplitude increases between signals output by the transistors SF in the pixels 10 of the first row and signals output by the transistors SF in the pixels 10 of the second row, electric current from the vertical signal line 25 is not easily fed to transistors SF having a lower signal amplitude. When the difference in signal amplitude between signals output by the transistors SF in the pixels 10 of the first row and signals output by the transistors SF in the pixels 10 of the second row is higher than a predetermined value, electric current is not fed to transistors SF having a high signal amplitude, and a source follower operation stops. This may prevent mixing of signals output from the pixels 10 of the first row and second row with high accuracy. Therefore, the quality of an image generated externally by using signals output by the image pickup device may deteriorate. The phenomenon that difference in signal amplitude between signals output by the transistors SF in the pixels 10 of the first row and signals output by the transistors SF in the pixels 10 of the second row is higher than a predetermined value may be significant when a low sensitivity is set for the image pickup device. This is because, a low sensitivity set for the image pickup device increases signal amplitudes of signals output from the transistors SF of the pixels 10 to which light enters from a subject having a high brightness, compared with a high sensitivity set for the image pickup device. Therefore, when the amplification factor of the differential amplifier circuit 300 is the second amplification factor, the image pickup device performs the second operation without performing the first operation.

In the second operation, on the other hand, the signal-to-noise ratio of signals output from the transistors SF tend to be lower than the signal-to-noise ratio of signals occurring in the vertical signal line 25 in the first operation. This is because a relationship of V=Q/C is satisfied where V is voltage of a signal output from a transistor SF, C is a capacitance value of a floating diffusion FD, and Q is electric carriers accumulated in a photoelectric conversion unit PD. Electrically connecting a plurality of floating diffusions FD results in an increase of the value of C. Therefore, with a fixed Q, the value of V decreases as the capacitance value of the floating diffusion FD increases. According to this exemplary embodiment, because the capacitance value of the floating diffusions FD in the second operation is higher than that in the first operation, the signal amplitude of signals output from transistors SF is lower in the second operation than that in the first operation when Q is fixed. On the other hand, the noise signals output from the transistors SF mainly contain a noise component of the transistors SF. Thus, the signal value of the noise signals output from the transistors SF may be regarded as equal in the first operation and the second operation. Therefore, the signal-to-noise ratio of the signal output to the vertical signal line 25 in the second operation tends to be lower than that in the first operation.

When a high sensitivity is set as in an imaging scene such as imaging at night with a small light quantity, the pixels 10 may output signals containing less noise in the first operation, compared to the second operation. Therefore, when a high sensitivity is set, that is, when the amplification factor of the differential amplifier circuit 300 is the first amplification factor, the first operation is performed without performing the second operation.

When the differential amplifier circuit 300 has a high amplification factor, the first operation is performed. When the differential amplifier circuit 300 has a low amplification factor, the second operation is performed. Thus, the image pickup device may output signals for acquiring a good image in various imaging scenes.

Conditions for performing the first operation without performing the second operation will be described below. A difference between a higher limit and a lower limit of a range of possible amplitudes of the potential of input nodes of transistors SF in the pixels 10 will be called $\Delta VFD(V)$. $\Delta VFD$ is a value that fluctuates in accordance with the amplification factor of the signal processing circuit 30 in the image pickup device.

$\Delta VFD$ will be described below in a case where the amplification factor of the differential amplifier circuit 300 changes, which is an example of the amplification factor of the signal processing circuit 30, for example. The range of possible amplitudes of signals output from the differential amplifier circuit 300 is substantially fixed even when the amplification factor of the differential amplifier circuit 300 changes. Therefore, as the amplification factor of the differential amplifier circuit 300 increases, the range of possible amplitudes of signals to be input to the differential amplifier circuit 300 decreases. In other words, as the amplification factor of the differential amplifier circuit 300 increases, the range of possible amplitudes of signals output from the transistors SF in the pixels 10 decreases. The range of amplitudes of signals output from the transistors SF is proportional to $\Delta VFD$ which is a range of possible amplitudes of the potential of the floating diffusion FD. Therefore, as the amplification factor of the differential amplifier circuit 300 increases, the value of $\Delta VFD$ decreases. In other words, the difference between the potential of floating diffusion regions FD of the pixels 10 to which light having high brightness enters and the potential of floating diffusion regions FD having low brightness decreases as the amplification factor of the differential amplifier circuit 300 increases.

A value of electric current to be supplied from a current source, not illustrated, to the vertical signal line 25 will be called I ($\mu A$). The channel widths and channel lengths of the transistors SF in the pixels 10 of the first row and of the transistors SF in the pixels 10 of the second row will be called W and L, respectively. It is assumed here that W/L of the transistors SF in the pixels 10 of the first row is equal to W/L of the transistors SF in the pixels 10 of the second row. An evaluation index Z is given by the following Expression (1).

$$Z = I / \{(W/L) \times \Delta VFD^2\} \qquad (1)$$

As the amplification factor of the differential amplifier circuit 300 increases, the value of the evaluation index Z increases because $\Delta VFD$ decreases. The image pickup device of this exemplary embodiment may perform the first operation without performing the second operation with the amplification factor of the signal processing circuit 30 where the evaluation index Z is equal to or higher than 2.5. The image pickup device of this exemplary embodiment has a value of the evaluation index Z equal to or higher than 2.5 when the signal processing circuit 30 amplifies signals with the first amplification factor.

According to this exemplary embodiment, the transistors T in the pixels 10 of the first row and second row are all turned on in the second operation, transistors Tc in one of the rows may be turned on. However, when the transistors Tc in the pixels 10 of the first row and second row are all turned on, the channel width and channel length of the transistors SF may be increased effectively. When transistors Tc of the first row and second row are all turned on, there is an effect that 1/f noise contained in the SFMix signal may be reduced, compared with a case where transistors Tc of one of the first row and second row are turned on.

Each of the pixels 10 has the transistor Tc according to this exemplary embodiment. Alternatively, each of the pixels 10 may not have the transistor Tc but the transistor SF may be electrically connected to the vertical signal line 25. In this case, a voltage VDD1 or a voltage VDD2 different from the voltage VDD1 is selectively supplied to a main node of the transistor Ta. In the pixels 10 of a row which outputs signals to the vertical signal line 25, the voltage VDD1 resets input nodes of the transistors SF so that the transistors SF perform a source follower operation. On the other hand, a power supply voltage VDD2 resets input nodes of the transistors SF in the pixels 10 of other non-selected rows so that the transistors SF are turned off. The image pickup device may perform the first operation by resetting, with the voltage VDD1, input nodes of the transistors SF in the pixels 10 of a plurality of rows.

Second Exemplary Embodiment

An image pickup device according to a second exemplary embodiment will be described below with focus on differences from the first exemplary embodiment. A first operation of this exemplary embodiment is the same as the first operation of the first exemplary embodiment. A second operation of this exemplary embodiment is different from the second operation of the first exemplary embodiment.

Figure 5:
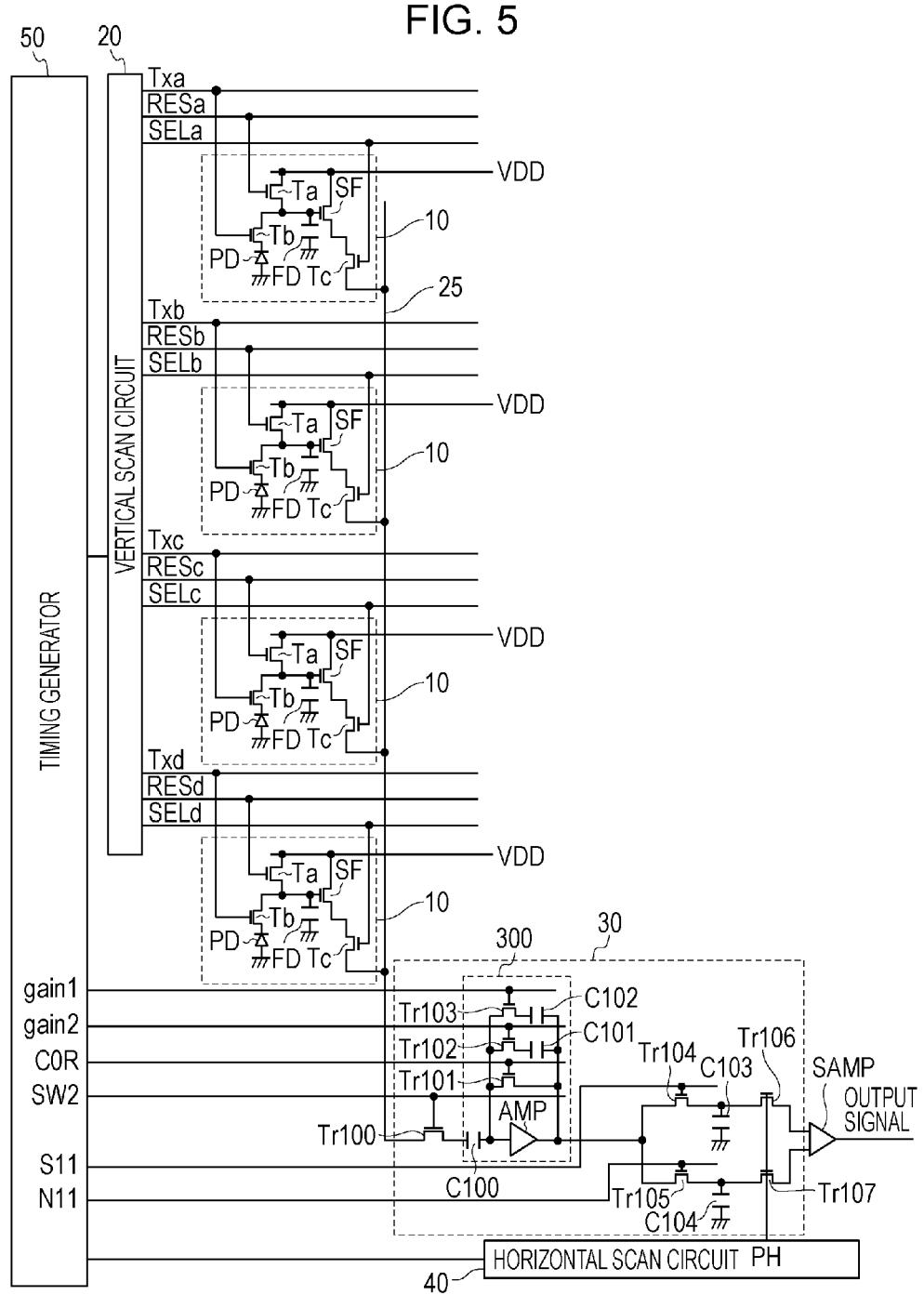
FIG. 5 illustrates an example of a configuration of an image pickup device.

FIG. 5 illustrates a configuration of the image pickup device according to this exemplary embodiment. In FIG. 5, like numbers to the numbers in FIG. 2 refer to like parts having like functions to those illustrated in FIG. 2. The image pickup device illustrated in FIG. 5 includes pixels 10 of four rows. While the image pickup device illustrated in FIG. 2 according to the first exemplary embodiment has a transistor Td which electrically connects floating diffusions FD of a plurality of pixels 10, the image pickup device of this exemplary embodiment does not have the transistor Td.

Like the first exemplary embodiment, the image pickup device of this exemplary embodiment performs the first operation if the amplification factor of the differential amplifier circuit 300 is the first amplification factor and performs the second operation if the amplification factor of the differential amplifier circuit 300 is the second amplification factor lower than the first amplification factor. The first operation associated with the pixels 10 of the first row and second row in the image pickup device illustrated in FIG. 5 is the same as the first operation of the image pickup device of the first exemplary embodiment. The first operation associated with the pixels 10 of the third row and fourth row is also the first operation relating to the pixels 10 of the first row and second row according to the first exemplary embodiment.

A second operation of the image pickup device according to this exemplary embodiment will be described next. The second operation according to this exemplary embodiment is a thinning-out operation which allows pixels 10 of partial rows to output signals and inhibits pixels 10 of the other rows from outputting signals. In other words, the pixels 10 of the first row and third row are allowed to sequentially output signals while the pixels 10 of the second row and fourth row are inhibited from outputting signals. Thus, the second operation in the image pickup device during one frame period outputs signals based on the pixels 10 of the first row and third row while does not output signals based on the pixels 10 of the second row and fourth row.

The first operation performed when the differential amplifier circuit 300 amplifies signals with the second amplification factor may cause the following problems, as in the first exemplary embodiment. That is, when a difference between signals output by the pixels 10 to which light having high brightness enters and signals output by the pixels 10 to which light having low brightness enters is higher than a predetermined value, the signals from these pixels 10 may not often be mixed with high accuracy. On the other hand, signal output from pixels 10 having a small difference in brightness therebetween may be mixed with high accuracy. This results in an image generated by the signal output by the image pickup device having a region where signal of a plurality of pixels 10 are mixed with high accuracy and a region where such signals are not mixed with high accuracy. Therefore, the image quality may be reduced. On the other hand, the image pickup device of this exemplary embodiment performs the second operation so that signals from the partial pixels 10 are used all over a resulting image. Thus, deterioration of image quality may be avoided.

On the other hand, the image pickup device of this exemplary embodiment also performs the first operation, like the first exemplary embodiment, when the differential amplifier circuit 300 amplifies signals with the first amplification factor. Thus, the same effect as the effect of the first exemplary embodiment may be acquired.

In the second operation according to this exemplary embodiment, the vertical scan circuit 20 selects pixels 10 of partial rows so that the image pickup device output fewer signals than the number of a plurality of pixel 10. According to another example, the horizontal scan circuit 40 may cause partial signal processing circuits 30 of the signal processing circuits 30 of all columns to output signals to the amplifier SAMP. The second operation may include a combination of an operation for selecting partial rows to be performed by the vertical scan circuit 20 and an operation for selecting partial signal processing circuits 30 to be performed by the horizontal scan circuit 40.

Third Exemplary Embodiment

An image pickup device according to a third exemplary embodiment will be described with focus on differences from the first exemplary embodiment.

Figure 6:
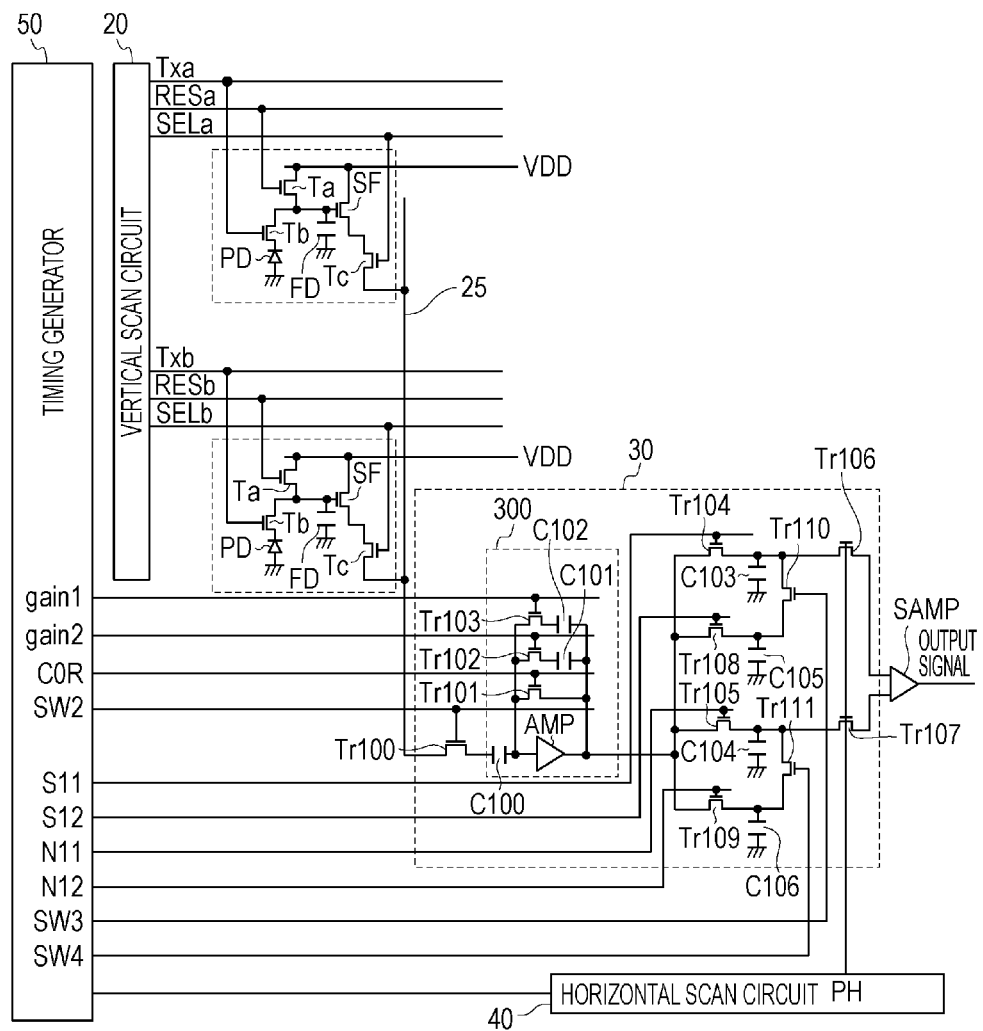
FIG. 6 illustrates an example of a configuration of an image pickup device.

FIG. 6 illustrates a configuration of the image pickup device according to this exemplary embodiment. In FIG. 6, like numbers to the numbers in FIG. 2 refer to like parts having like functions to those illustrated in FIG. 2. While the image pickup device illustrated in FIG. 2 according to the first exemplary embodiment has a transistor Td which electrically connects floating diffusions FD of a plurality of pixels 10, the image pickup device of this exemplary embodiment does not have the transistor Td.

The signal processing circuit 30 of this exemplary embodiment further includes a capacitative element C103, a capacitative element C106, a transistor Tr 108, a transistor Tr 109, a transistor Tr 110, and a transistor Tr 111. The transistor Tr 108, transistor Tr 109, transistor Tr 110, and transistor Tr 111 are controlled with signal S12, signal N12, signal SW3, and signal SW4, respectively output from the timing generator 50.

Also according to this exemplary embodiment, the image pickup device performs a first operation when the amplification factor of the differential amplifier circuit 300 is the first amplification factor. If the amplification factor of the differential amplifier circuit 300 is a second amplification factor lower than the first amplification factor, the image pickup device performs a second operation.

In the first operation performed by the image pickup device according to this exemplary embodiment, the signal S12, signal N12, signal SW3, and signal SW4 always have an L level. Operations of the signals are the same as the first operation of the first exemplary embodiment.

The second operation of the image pickup device of this exemplary embodiment will be described.

Figure 7:
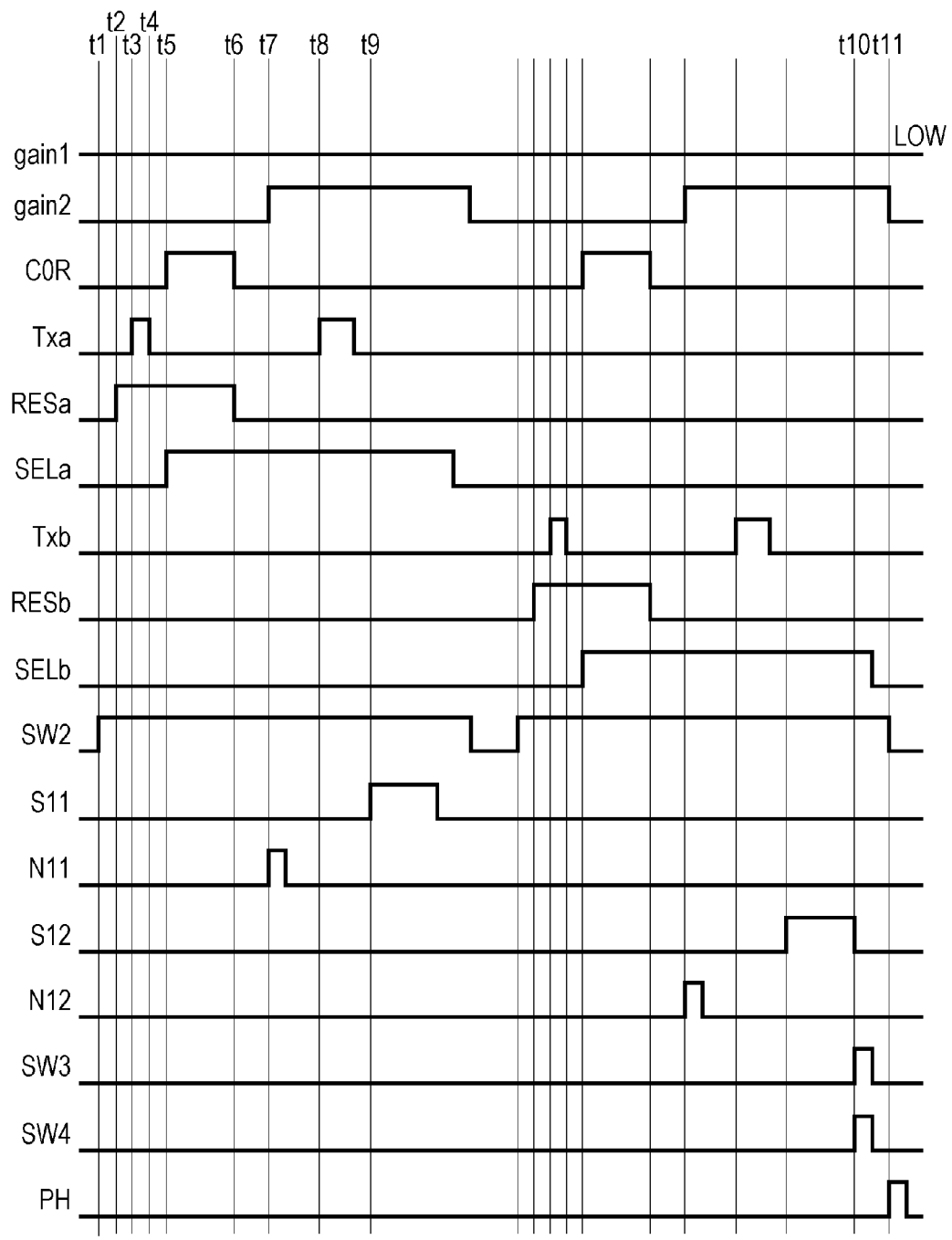
FIG. 7 illustrates an example of an operation of an image pickup device.

FIG. 7 illustrates operation of the image pickup device illustrated in FIG. 6.

At a time t1, the timing generator 50 outputs the signal S12, signal N12, signal SW3, and signal SW4 all having an L level. At the time t1, the timing generator 50 changes the signal SW2 to an H level. Thus, an electrical path between pixel 10 and the differential amplifier circuit 300 is brought into conduction.

At time t2, vertical scan circuit 20 changes the signal RESa to an H level. This resets the potential of the floating diffusion FD in the pixels 10 of the first row.

At a time t3, the vertical scan circuit 20 changes the signal TXa to an H level. This resets electric carriers in the photoelectric conversion units PD in the pixels 10 of the first row. After that, the vertical scan circuit 20 at a time t4 changes the signal TXa to an L level.

At a time t5, the timing generator 50 changes the signal COR to an H level. This resets electric carriers in the capacitative element C100, capacitative element C101, and capacitative element C102 in the differential amplifier circuit 300. At the time t5, the vertical scan circuit 20 changes the signal SELa to an H level. Thus, the transistors SF in the pixels 10 of the first row output signals to the vertical signal line 25 through the transistors Tc.

At a time t6, the vertical scan circuit 20 changes the signal RESa to an L level. This release the reset of the floating diffusions FD in the pixels 10 of the first row. At the time t6, the timing generator 50 changes the signal COR to an L level.

At a time t7, the timing generator 50 changes the signal N11 to an H level. This turns on the transistor Tr 105. After that, the timing generator 50 changes the signal N11 to an L level. Thus, the capacitative element C104 holds signals output from the differential amplifier circuit 300. The signals held in the capacitative element C104 are noise signal mainly containing an offset component of the differential amplifier circuit 300.

At a time t8, the vertical scan circuit 20 changes the signal TXa to an H level. After that, the vertical scan circuit 20 changes the signal TXa to an L level. Thus, electric carriers generated by the photoelectric conversion units PD in the pixels 10 of the first row are transferred to the floating diffusions FD. The transistors SF in the pixels 10 of the first row outputs signals based on electric carriers held in the floating diffusions FD to the vertical signal line 25 through the transistor Tc. The signals will be called an FDS signal. The differential amplifier circuit 300 outputs signals acquired by amplifying the FDS signals with the second amplification factor.

At a time t9, the timing generator 50 changes the signal S11 to an H level. This brings an electrical path between the capacitative element C103 and the differential amplifier circuit 300 into conduction. After that, the timing generator 50 changes the signal S11 to an L level. Thus, the capacitative element C103 holds signals acquired by amplifying the FDS signals by the differential amplifier circuit 300 with the second amplification factor.

After that, the timing generator 50 and the vertical scan circuit 20 perform operations relating to FDS signals from the pixels 10 of the second row and a noise signal mainly containing an offset component of the differential amplifier circuit 300. These operations are the same as the operation relating to the pixels 10 of the first row except that the capacitative element C105 holds FDS signals and the capacitative element C106 holds a noise signal mainly containing an offset component of the differential amplifier circuit 300.

At a time t10, the timing generator 50 changes the signal SW3 to an H level. Thus, the transistor Tr 110 is turned on, and FDS signals output from the pixels 10 of the first row and held in the capacitative element C103 and FDS signals output from the pixels 10 of the second row and held in the capacitative element C105 are mixed. At the same time, timing generator 50 changes the signal SW4 to an H level. Thus, the transistor Tr 111 is turned on, and the noise signal held in the capacitative element C104 and the noise signal held in the capacitative element C106 are mixed.

At a time t11, the horizontal scan circuit 40 changes the signal PH to an H level. Thus, the mixed FDS signal from the pixels 10 of the first row and the pixels 10 of the second row and the mixed noise signal are output to the amplifier SAMP.

The first operation according to this exemplary embodiment is the same as the first operation of the first exemplary embodiment. In other words, the first operation is an operation which mixes in the vertical signal line 25 a signal output from the transistor SF based on electric carriers generated by the first photoelectric conversion unit PD and a signal output from the transistor SF based on electric carriers generated by the second photoelectric conversion unit PD. In the second operation of this exemplary embodiment, the capacitative element C103 which is a first capacitative element in the signal processing circuit 30 holds a signal based on electric carriers generated by the first photoelectric conversion unit PD. The capacitative element C105 which is a second capacitative element in the signal processing circuit 30 holds a signal based on electric carriers generate by the second photoelectric conversion unit PD. The operation for mixing signals held by the first capacitative element and the second capacitative element corresponds to the second operation of this exemplary embodiment.

According to this exemplary embodiment, when the amplification factor of the differential amplifier circuit 300 is the first amplification factor, the image pickup device performs the first operation without performing the second operation. When the amplification factor of the differential amplifier circuit 300 is a second amplification factor lower than the first amplification factor, the image pickup device performs the second operation without performing the first operation.

Thus, the image pickup device of this exemplary embodiment may achieve the same effect as the effect of the first exemplary embodiment.

Fourth Exemplary Embodiment

An image pickup device according to a fourth exemplary embodiment will be described with focus on differences from the first exemplary embodiment. This exemplary embodiment is different from the first exemplary embodiment in that the second operation to be performed by the image pickup device is an operation which mixes a digital signal based on signals output from pixels 10 of a first row and a digital signal based on signal output from pixels 10 of a second row.

Figure 8:
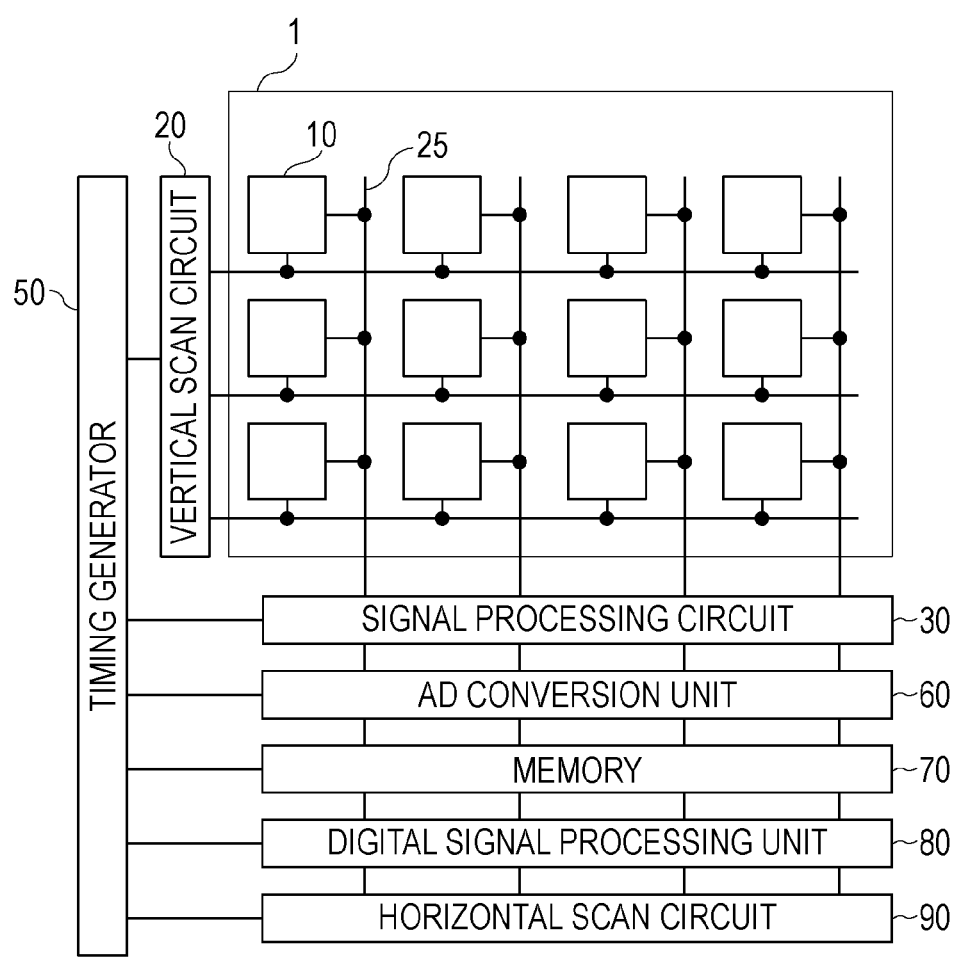
FIG. 8 illustrates an example of a configuration of an image pickup device.

FIG. 8 illustrates a configuration of the image pickup device according to this exemplary embodiment. In FIG. 8, like numbers to the numbers in FIG. 1 refer to like parts having like functions to those illustrated in FIG. 1. An image pickup device according to this exemplary embodiment includes an AD conversion unit 60 which converts a signal output from the signal processing circuit 30 to a digital signal and a memory 70 which hold a digital signal output from the AD conversion unit 60. The image pickup device according to this exemplary embodiment further includes a digital signal processing unit 80 which processes a digital signal output from the memory 70 and a horizontal scan circuit 90 which receives a digital signal output from the digital signal processing unit 80. The configuration of the signal processing circuit 30 is a configuration omitting the transistor Tr 104, transistor Tr 105, capacitative element C103, capacitative element C104, transistor Tr 106, and transistor Tr 107 from the configuration illustrated in FIG. 2. In other words, the differential amplifier circuit 300 has an output node electrically connected to an input node of the AD conversion unit 60.

The memory 70 and the digital signal processing unit 80 are provided in each of columns for each of the signal processing circuit 30 in each of the columns.

The configuration of each of the pixels 10 is the same as the configuration illustrated in FIG. 6.

According to this exemplary embodiment, when the amplification factor of the differential amplifier circuit 300 is a first amplification factor, a first operation is performed, like the first exemplary embodiment. Thus, a signal acquired by amplifying the SFMix signal with the first amplification factor by the differential amplifier circuit 300 is output to the AD conversion unit 60. The AD conversion unit 60 converts the signal output from the differential amplifier circuit 300 to a digital signal. The digital signal will be called a digital SFMix signal. The memory 70 hold the digital SFMix signal output from the AD conversion unit 60. The digital signal processing unit 80 holds the digital SFMix signal output from the memory 70. The horizontal scan circuit 90 causes the digital signal processing unit 80 of each column to output a digital SFMix signal held by the digital signal processing unit 80.

On the other hand, a second operation is performed when the amplification factor of the differential amplifier circuit 300 is a second amplification factor lower than the first amplification factor. The second operation of this exemplary embodiment will be described. The signal processing circuit 30 amplifies with the second amplification factor signals output from the pixels 10 of the first row based on electric carriers generated by the photoelectric conversion unit PD in the pixels 10 and outputs them to the AD conversion unit 60. Hereinafter, the signal output from the differential amplifier circuit 300 will be called an amplified SF1 signal. The signal processing circuit 30 amplifies with the second amplification factor signals output from the pixels 10 of the second row based on electric carriers generated by the photoelectric conversion unit PD in the pixels 10 and outputs them to the AD conversion unit 60. Hereinafter, the signal output from the differential amplifier circuit 300 will be called an amplified SF2 signal. The AD conversion unit 60 converts the amplified SF1 signals and amplified SF2 signals to digital signals. The memory 70 holds the digital signal based on the amplified SF1 signals and the digital signals based on the amplified SF2 signals. The digital signal processing unit 80 mixes the digital signal based on the amplified SF1 signals held in the memory 70 and the digital signals based on the amplified SF2 signals.

The horizontal scan circuit 90 causes the digital signal processing unit 80 of each of the columns to sequentially output the mixed digital signal held by the digital signal processing unit 80 of the column.

Thus, the image pickup device of this exemplary embodiment may achieve the same effect as that of the first exemplary embodiment.

Both or one of the first operation and second operation may include an operation for converting a noise signal to a digital signal by the AD conversion unit 60. In this case, the digital signal processing unit 80 may perform an operation for subtracting a digital signal based on a noise signal from a digital signal based on electric carriers generated by the photoelectric conversion unit PD.

The AD conversion unit 60 may apply a slope type AD conversion which measures a time period from start of comparison between a reference signal having a potential changing time-dependently and an analog signal to a change of the comparison result. The AD conversion unit 60 may apply successive approximation, flash-, pipeline, delta sigma, double integration or other AD conversion.

Fifth Exemplary Embodiment

An image pickup device according to a fourth exemplary embodiment will be described with focus on differences from the first exemplary embodiment. An image pickup device of this exemplary embodiment is different from the first exemplary embodiment in a configuration of a pixel 10.

Figure 9:
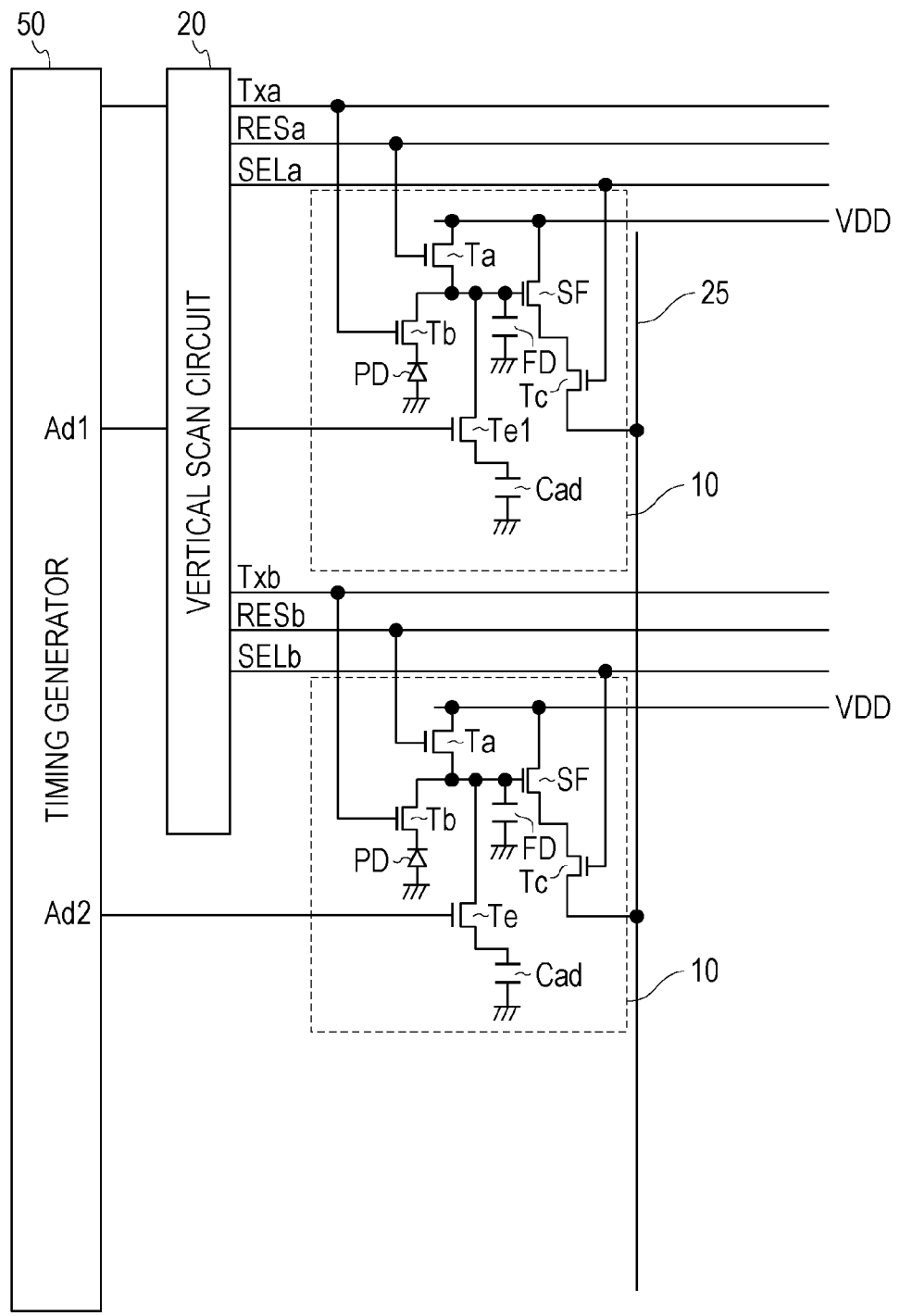
FIG. 9 illustrates an example of a configuration of an image pickup device.

FIG. 9 illustrates pixels 10, a vertical scan circuit 20 and a timing generator 50 in an image pickup device of this exemplary embodiment. In FIG. 9, like numbers to the numbers in FIG. 2 refer to like parts having like functions to those illustrated in FIG. 2. The image pickup device of this exemplary embodiment is different from the image pickup device of the first exemplary embodiment in that each of the pixels 10 has a transistor Te and a capacitative element Cad. The transistors Te in the pixels 10 of the first row and second row are controlled by a signal Ad 1 and a signal Ad 2 output from the timing generator 50. The signal processing circuit 30 of this exemplary embodiment has the same configuration as that of the signal processing circuit 30 of the first exemplary embodiment.

A first operation of this exemplary embodiment may be the same as that of the first exemplary embodiment. The signal Ad 1 and signal Ad 2 have an L level during a period for the first operation.

Figure 10:
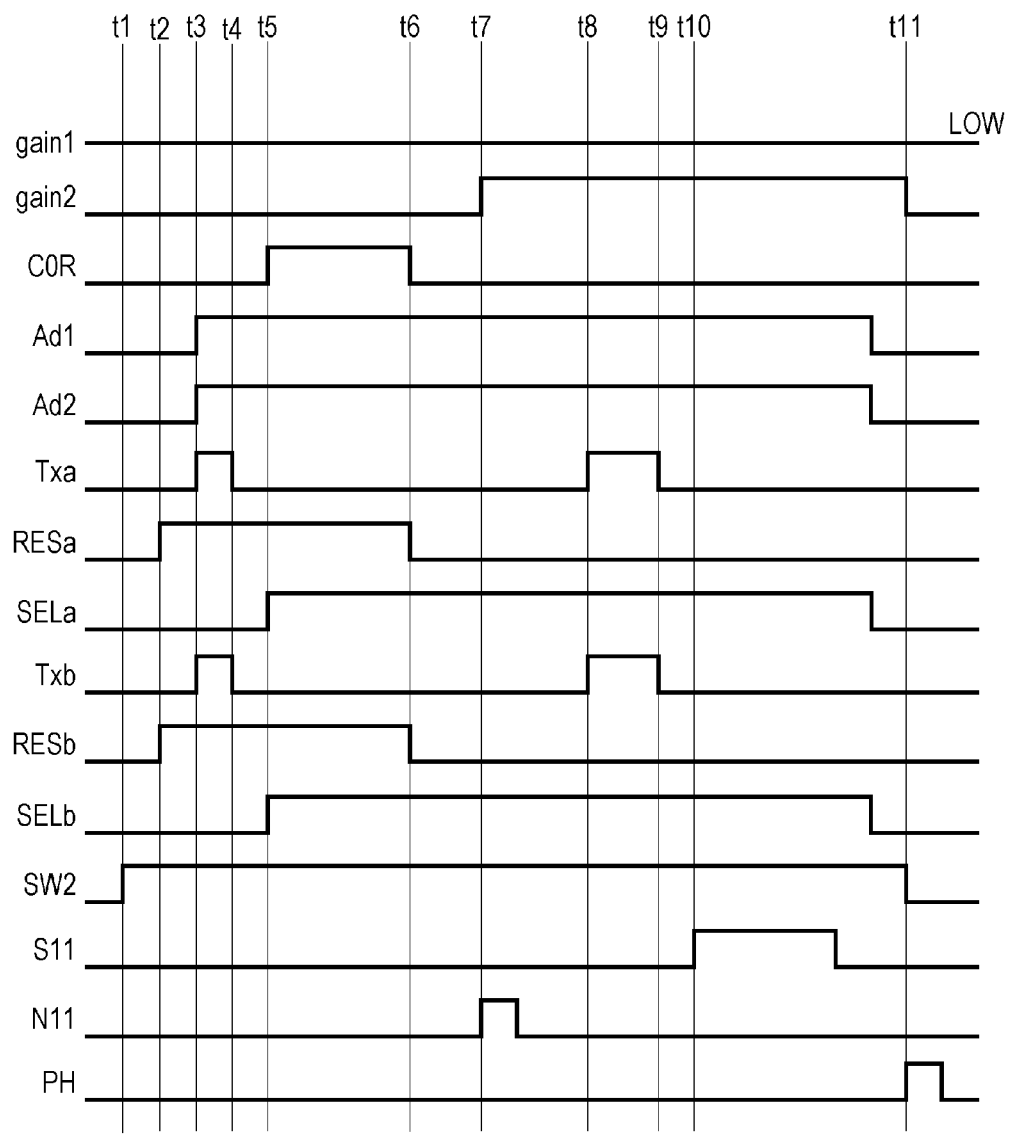
FIG. 10 illustrates an example of an operation of an image pickup device.

Next, a second operation of this exemplary embodiment will be described. FIG. 10 illustrates a second operation of the image pickup device according to this exemplary embodiment. The second operation of the image pickup device according to this exemplary embodiment is the same as that of the first exemplary embodiment except for operations relating to the signal Ad 1 and signal Ad 2. In the image pickup device of this exemplary embodiment, the timing generator 50 changes the signal Ad 1 and the signal Ad 2 to an H level during a period from a time when the signal Txa and signal Txb are changed to an H level to a time when the signal SELa and signal SELb are changed to an L level. Thus, electric carriers generated by the photoelectric conversion units PD in the pixels 10 of a first row are transferred to an added capacitance of the capacitative element Cad and a floating diffusion FD. Thus, the transistor SF may output a signal having a signal amplitude signal smaller than the signal amplitude occurring when the signal Ad 1 has an L level. Thus, the transistor SF in pixels 10 of the second row may output a signal having a signal amplitude signal smaller than the signal amplitude occurring when the signal Ad 2 has an L level. Thus, This results in a smaller difference between signals output from the transistors SF in the pixels 10 of the first row and signals output from the transistors SF in the pixels 10 of the second row, compared with a case where both of the signal Ad 1 and signal Ad 2 have an L level. Thus, compared with the image pickup device according to the first exemplary embodiment, a source follower operation of one transistor SF may not occur easily due to a large difference between signals output from the transistors SF in the pixels 10 of the first row and second row. This allows easy mixing of signals output from the transistors SF in the pixels 10 of the first row and pixels 10 of the second row, compared with the image pickup device of the first exemplary embodiment.

Also according to this exemplary embodiment, an evaluation index Z may be used to determine which of the first operation and the second operation is to be performed, like the first exemplary embodiment. In this case, the first operation may be performed if the amplification factor of the signal processing circuit 30 leads to an evaluation index Z of 2.5 or higher.

Sixth Exemplary Embodiment

An image pickup device according to a sixth exemplary embodiment will be described with focus on differences from the fourth exemplary embodiment.

Figure 11:
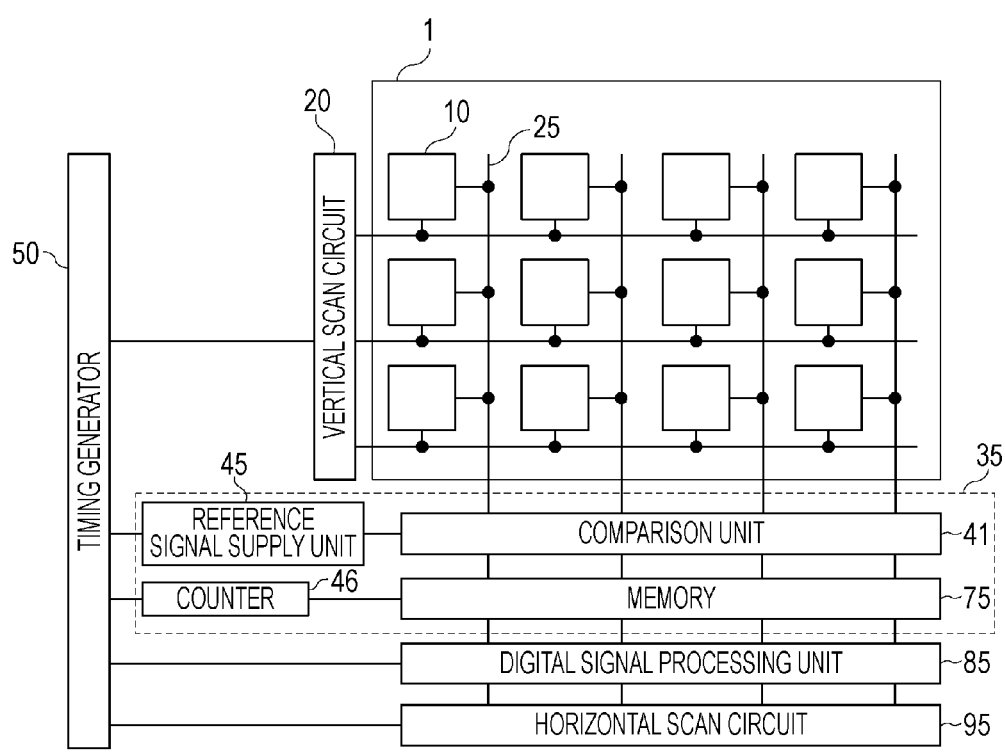
FIG. 11 illustrates an example of a configuration of an image pickup device.

FIG. 11 illustrates a configuration of the image pickup device according to this exemplary embodiment. In FIG. 11, like numbers to the numbers in FIG. 8 refer to like parts having like functions to those illustrated in FIG. 8. An image pickup device of this exemplary embodiment is different from that of the fourth exemplary embodiment in a configuration of a signal processing circuit 35. The signal processing circuit 35 has a comparison unit 41, a memory 75, a reference signal supply unit 45, and a counter 46. The comparison unit 41 and memory 75 are provided for each column of pixels 10. The reference signal supply unit 45 supplies a reference signal having a potential which changes time-dependently to the comparison unit 41 of each column. The comparison unit 41 outputs a comparison result signal indicating a result of a comparison between a signal output to the vertical signal line 25 and a reference signal to the memory 75. The counter 46 supplies a count signal indicating counted clocks to the memory 75 of each column. The memory 75 holds a count signal based on a signal value of the comparison result signal. A digital signal processing unit 85 processes a digital signal held in the memory 75. The digital signal processing unit 85 is provided for the memory 75 of each column. A horizontal scan circuit 95 causes the digital signal processing unit 85 of columns to sequentially output digital signals processed by the digital signal processing unit 85.

Figure 12A:
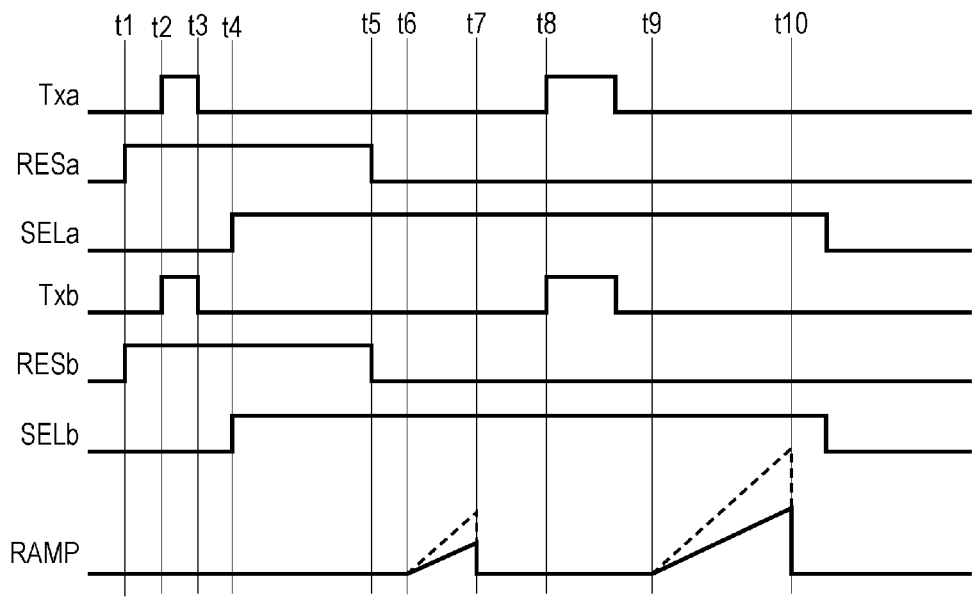
FIGS. 12A and 12B illustrate examples of an operation of an image pickup device.

FIG. 12A illustrates operations performed by the image pickup device illustrated in FIG. 11. A reference signal RAMP illustrated in FIG. 12A is output from the reference signal supply unit 45. The reference signal RAMP exhibits a time-dependent change in potential in a period from a time t6 to a time t7 and in a period from a time t9 to a time t10. The reference signal RAMP exhibits a change in potential indicated by a solid line in a first operation of this exemplary embodiment and exhibits a change in potential indicated by a broken line in a second operation of this exemplary embodiment. The reference signal RAMP indicated by the solid line has a gradient smaller than a gradient of the reference signal RAMP indicated by the broken line. Therefore, when an analog signal having one signal value is converted with the reference signal RAMP indicated by the solid line and the reference signal RAMP indicated by the broken line to a digital signal, the digital signal generated with the reference signal RAMP indicated by the solid line has a higher signal value. Therefore, the amplification factor for the AD conversion with the reference signal RAMP indicated by the solid line is higher than that for the AD conversion with the reference signal RAMP indicated by the broken line. The image pickup device of this exemplary embodiment performs a first operation for a first sensitivity and performs a second operation for a second sensitivity lower than the first sensitivity.

During a period from a time t5 to a time t7, the vertical signal line 25 receives a signal acquired by mixed noise signals output from the pixels 10 of the first row and noise signals output from the pixels 10 of the second row. This signal will be called a mixed noise signal. The signal processing circuit 35 uses the reference signal RAMP indicated by the solid line to convert the mixed noise signal output to the vertical signal line 25 to a digital signal. The memory 75 holds the digital signal based on the mixed noise signal.

During a period from a time t9 to a time t10, an SFMix signal is output to the vertical signal line 25. The signal processing circuit 35 uses the reference signal RAMP indicated by the solid line to convert the SFMix signal output to the vertical signal line 25 to a digital signal. The memory 75 holds a digital signal based on the SFMix signal.

The digital signal processing unit 85 generates a digital signal indicative of a difference between a digital signal based on the SFMix signal and a digital signal based on the mixed noise signal.

Figure 12B:
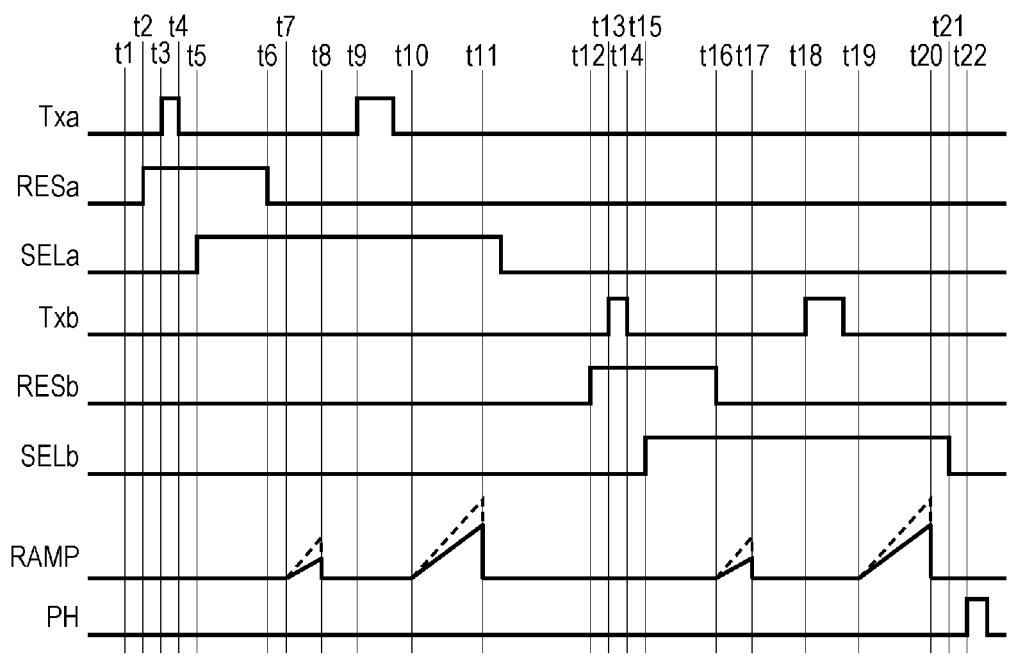

FIG. 12B illustrates the second operation of this exemplary embodiment. During a period from a time t8 to a time t9, the pixels 10 of the first row output noise signals. The signal processing circuit 35 uses the reference signal RAMP indicated by the broken line to convert the noise signals to digital signals. The memory 75 holds the digital signals based on the noise signals. The digital signal will be called a digital N1 signal. During a period from a time t10 to a time t11, the pixels 10 of the first row output signals based on electric carriers accumulated in the photoelectric conversion units PD. The signal processing circuit 35 uses the reference signal RAMP indicated by the broken line to convert the signals to digital signals. The memory 75 holds digital signals based on electric carriers in the photoelectric conversion units PD in the pixels 10 of the first row. The digital signal will be called a digital S1 signal.

During a period from a time t16 to a time t17, the pixels 10 of the second row output noise signals. The signal processing circuit 35 uses the reference signal RAMP indicated by the broken line to convert the noise signals to digital signals. The memory 75 holds the digital signals based on the noise signals. The digital signal will be called a digital N2 signal. During a period from a time t19 to a time t20, the pixels 10 of the second row output signals based on electric carriers accumulated in the photoelectric conversion unit PD. The signal processing circuit 35 uses the reference signal RAMP indicated by the broken line to convert the signals to digital signals. The memory 75 holds the digital signals based on electric carriers in the photoelectric conversion units PD in the pixels 10 of the second row. The digital signal will be called a digital S2 signal.

The digital signal processing unit 85 mixes the digital N1 signal and the digital N2 signal. The digital signal processing unit 85 mixes the digital S1 signal and the digital S2 signal. The mixing operation may be a process for adding digital signals or a process for acquiring a mean between digital signals.

If the amplification factor of the AD conversion is high, that is, if the gradient of the reference signal RAMP is small, the image pickup device of this exemplary embodiment performs the first operation. If the amplification factor of the AD conversion is low, that is, if the gradient of the reference signal RAMP is high, the image pickup device according to this exemplary embodiment performs the second operation. Thus, the image pickup device of this exemplary embodiment may achieve the same effect as that of the first exemplary embodiment.

According to this exemplary embodiment, the second operation corresponds to an operation to be performed by the digital signal processing unit 85 for mixing digital signals based on electric carriers generated by the photoelectric conversion unit PD in pixels 10 of a plurality of rows. An alternative second operation may mix electric carriers by using the floating diffusions FD in pixels 10 of a plurality of rows, as in the first exemplary embodiment.

A further alternative second operation may output signals from pixels 10 of partial rows, as in the second exemplary embodiment.

Alternatively, the pixels 10 in the image pickup device of this exemplary embodiment may have the same configuration as that of the pixels 10 according to the fifth exemplary embodiment, and the first operation may transfer electric carriers generated by the photoelectric conversion units PD to the capacitative elements Cad and floating diffusions FD. Thus, the same effect as that of the image pickup device according to the fifth exemplary embodiment may be achieved.

Seventh Exemplary Embodiment

FIG. 13 illustrates an imaging system according to a seventh exemplary embodiment.

The imaging system according to this exemplary embodiment includes an image pickup device 101, an optical system 100 which guides light to the image pickup device, and an amplification unit 102 which amplifies a signal output from the image pickup device 101. The imaging system further includes an output signal processing unit 104 which converts a signal output from the amplification unit 102 to a digital signal and generates an image by using the digital signal. The imaging system further includes a display unit 105 which displays an image output from the output signal processing unit 104 and a recording unit 106 which records an image output from the output signal processing unit 104. The imaging system further includes a mode switching unit 107 which switches the operation of the image pickup device between a first operation and a second operation and an amplification factor setting unit 108 which sets an amplification factor of the amplification unit 102. The imaging system further includes a general control unit 109 which generally controls the imaging system. The image pickup device 101 and the amplification unit 102 are provided on semiconductor substrates different from each other.

Any one of the configurations according to the first to sixth exemplary embodiments is applicable as the configuration of the image pickup device 101 of this exemplary embodiment. An example in which the image pickup device of the first exemplary embodiment is applied will be described below.

The general control unit 109 outputs a control signal for setting an amplification factor of the amplification unit 102 to the amplification factor setting unit 108. In this case, the general control unit 109 may output a control signal for setting one of a first amplification factor and a second amplification factor lower than the first amplification factor to the amplification factor setting unit 108, for example. The general control unit 109 outputs a control signal for setting an operation mode of the image pickup device 101 to the mode switching unit 107.

A case will be described in which the general control unit 109 outputs to the amplification factor setting unit 108 a control signal which defines that the amplification factor of the amplification unit 102 is a first amplification factor. Based on the control signal, the amplification factor setting unit 108 sets the first amplification factor for the amplification unit 102. The general control unit 109 output to the mode switching unit 107 a control signal which defines that the operation to be performed by the image pickup device 101 is a first operation. Based on the control signal, the mode switching unit 107 sets the operation to be performed by the image pickup device 101 to the first operation.

A case will be described in which the general control unit 109 on the other hand outputs to the amplification factor setting unit 108 a control signal in which the amplification factor of the amplification unit 102 is a second amplification factor. Based on the control signal, the amplification factor setting unit 108 sets the second amplification factor for the amplification unit 102. The general control unit 109 outputs to the mode switching unit 107 a control signal which defines the operation to be performed by the image pickup device 101 is a second operation. Based on the control signal, the mode switching unit 107 sets the operation to be performed by the image pickup device 101 to the second operation.

Thus, if the amplification factor of the amplification unit 102 is a first amplification factor, the image pickup device 101 performs the first operation. If the amplification factor of the amplification factor is a second amplification factor lower than the first amplification factor, the image pickup device 101 performs the second operation. Also in the imaging system according to this exemplary embodiment, the same effect as the effect achieved by the image pickup device of the first exemplary embodiment may be achieved.

The amplification factor of the differential amplifier circuit 300 provided within the image pickup device 101 may be interlocked with the amplification factor of the amplification unit 102.

According to this exemplary embodiment, the example has been described in which the output signal processing unit 104 has an AD conversion function. Alternatively, the amplification unit 102 may have an AD conversion function. In this case, the amplification factor setting unit 108 sets the amplification factor for the AD conversion to one of the first amplification factor and the second amplification factor. Also in this case, if the first amplification factor is set, the general control unit 109 outputs to the mode switching unit 107 a control signal which sets the operation to be performed by the image pickup device 101 to the first operation. If the second amplification factor is set, the general control unit 109 outputs to the mode switching unit 107 a control signal which sets the operation to be performed by the image pickup device 101 to the second operation. Also in this example, the same effect as that of the sixth exemplary embodiment may be achieved.

The present invention may provide an image pickup device with high functionality compared with image pickup devices in the past.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-097148, filed May 8, 2014, which is hereby incorporated by reference herein in its entirety.

What is claimed is:

1. A driving method for an image pickup device having a plurality of pixels, a vertical signal line, and a signal processing circuit, the plurality of pixels having a first pixel and a second pixel, the first pixel having a first photoelectric conversion unit and a first amplifying transistor, the second pixel having a second photoelectric conversion unit; and a second amplifying transistor, the method comprising:
  amplifying a signal output to the vertical signal line with one of a first amplification factor and a second amplification factor lower than the first amplification factor by the signal processing circuit;
  performing a first operation if the signal processing circuit amplifies the signal output to the vertical signal line with the first amplification factor; and
  performing a second operation without performing the first operation if the signal processing circuit amplifies the signal output to the vertical signal line with the second amplification factor,
  wherein the first operation includes an operation in which a first signal and a second signal are mixed in the vertical signal line by at least partially overlapping a period when the first amplifying transistor outputs the first signal based on electric carriers generated by the first photoelectric conversion unit to the vertical signal line with a period when the second amplifying transistor outputs the second signal based on electric carriers generated by the second photoelectric conversion unit to the vertical signal line; and
  the second operation includes an operation in which the first and second photoelectric conversion units output a first number of signals based on electric carriers acquired by performing photoelectric conversion on incident light, and includes an operation in which the image pickup device outputs a second number of signals by performing a process of the first number of signals, the second number being smaller than the first number.

2. The driving method for the image pickup device according to claim 1, wherein the process includes an operation in which electric carriers generated by the first photoelectric conversion unit and the second photoelectric conversion unit are mixed and at least one of the first amplifying transistor and the second amplifying transistor outputs a third signal based on the mixed electric carriers to the vertical signal line.

3. The driving method for the image pickup device according to claim 2, wherein
  the first pixel has a first floating diffusion which holds electric carriers;
  the second pixel has a second floating diffusion which holds electric carriers;
  the first signal is a signal output from the first amplifying transistor based on a potential of the first floating diffusion which holds electric carriers generated by the first photoelectric conversion unit;
  the second signal is a signal output from the second amplifying transistor based on a potential of the second floating diffusion which holds electric carriers generated by the second photoelectric conversion unit; and
  the mixed electric carriers are electric carriers generated by holding in the first floating diffusion and the second floating diffusion both of electric carriers generated by the first photoelectric conversion unit and electric carriers generated by the second photoelectric conversion unit.

4. The driving method for the image pickup device according to claim 1, wherein the process is an operation for, in one frame period, either outputting the first signal from the first amplifying transistor to the vertical signal line or outputting the second signal from the second amplifying transistor to the vertical signal line.

5. The driving method for the image pickup device according to claim 1, wherein the process is an operation for individually performing outputting the first signal from the first amplifying transistor to the vertical signal line and outputting the second signal from the second amplifying transistor to the vertical signal line and then mixing a signal based on the first signal and a signal based on the second signal.

6. The driving method for the image pickup device according to claim 5, wherein
  the signal processing circuit has an AD conversion unit which performs an AD conversion on a signal output to the vertical signal line to a digital signal; and
  the operation for mixing the first signal and the second signal includes mixing a digital signal acquired by performing an AD conversion on the first signal and a digital signal acquired by performing an AD conversion on the second signal.

7. The driving method for the image pickup device according to claim 1, wherein the signal processing circuit has an AD conversion unit which converts an analog signal to a digital signal with the first amplification factor and the second amplification factor.

8. A driving method for an image pickup device having a plurality of pixels, a vertical signal line, and a signal processing circuit, the plurality of pixels having a first pixel and a second pixel; the first pixel having a first photoelectric conversion unit, a first capacitative element, a first floating diffusion, and a first amplifying transistor, the second pixel having a second photoelectric conversion unit, a second capacitative element, a second floating diffusion, and a second amplifying transistor, the method comprising:
  amplifying a signal output to the vertical signal line with one of a first amplification factor and a second amplification factor lower than the first amplification factor by the signal processing circuit;
  performing a first operation if the signal processing circuit amplifies the signal output to the vertical signal line with the first amplification factor; and
  performing a second operation without performing the first operation if the signal processing circuit amplifies the signal output to the vertical signal line with the second amplification factor,
  wherein the first operation is an operation in which electric carriers generated by the first photoelectric conversion unit are held in the first floating diffusion without being held in the first capacitative element;

electric carriers generated by the second photoelectric conversion unit are held in the second floating diffusion without being held in the second capacitative element; and a first signal and a second signal are mixed in the vertical signal line by at least partially overlapping a period when the first amplifying transistor outputs the first signal based on a potential of the first floating diffusion to the vertical signal line and a period when the second amplifying transistor outputs the second signal based on a potential of the second floating diffusion to the vertical signal line; and the second operation is an operation in which electric carriers generated by the first photoelectric conversion unit are held in a first added capacitance of the first capacitative element and the first floating diffusion;

electric carriers generated by the second photoelectric conversion unit are held in a second added capacitance of the second capacitative element and the second floating diffusion; and the first signal and the second signal are mixed in the vertical signal line by at least partially overlapping a period when the first amplifying transistor outputs the first signal based on a potential of the first floating diffusion to the vertical signal line and a period when the second amplifying transistor outputs the second signal based on a potential of the second floating diffusion to the vertical signal line.

9. The driving method for the image pickup device according to claim 8, wherein the signal processing circuit has an AD conversion unit which converts an analog signal to a digital signal with the first amplification factor and the second amplification factor.

10. The driving method for the image pickup device according to claim 1, wherein the signal processing circuit has a differential amplifier circuit; and the differential amplifier circuit amplifies a signal output to the vertical signal line with the first amplification factor and the second amplification factor.

11. The driving method for the image pickup device according to claim 1, wherein a value of an evaluation index Z expressed by an expression below is equal to or higher than 2.5

$$Z=I/\{(W/L) \times \Delta VFD^2\}$$

where L is a channel length of each of the first amplifying transistor and the second amplifying transistor, W is a channel width of each of the first amplifying transistor and the second amplifying transistor, I (μA) is a value of electric current supplied to the vertical signal line, and ΔVFD(V) is a difference between a higher limit and a lower limit of a range possible with the first amplification factor of a potential of an input node of the first amplifying transistor and a potential of an input node of the second amplifying transistor.

12. A driving method for an imaging system having an image pickup device having a plurality of pixels and a vertical signal line, the plurality of pixels having a first pixel and a second pixel, the first pixel having a first photoelectric conversion unit and a first amplifying transistor, the second pixel having a second photoelectric conversion unit and a second amplifying transistor, and a control unit which controls the image pickup device, the image pickup device performing a first operation if the control unit sets a first sensitivity, the image pickup device performing a second operation without performing the first operation if the control unit sets a second sensitivity lower than the first sensitivity, wherein the first operation is an operation in which a first signal and a second signal are mixed in the vertical signal line by at least partially overlapping a period when the first amplifying transistor outputs the first signal based on electric carriers generated by the first photoelectric conversion unit to the vertical signal line with a period when the second amplifying transistor outputs the second signal based on electric carriers generated by the second photoelectric conversion unit to the vertical signal line; and the second operation is an operation in which the first and second photoelectric conversion units output a first number of signals based on electric carriers acquired by performing photoelectric conversion on incident light, and includes an operation in which the image pickup device outputs a second number of signals by performing a process of the first number of signals, the second number being smaller than the first number.

13. The driving method for the image pickup device according to claim 12, wherein a value of an evaluation index Z expressed by an expression below is equal to or higher than 2.5

$Z=I/\{(W/L) \times \Delta VFD^2\}$ where L is a channel length of each of the first amplifying transistor and the second amplifying transistor, W is a channel width of each of the first amplifying transistor and the second amplifying transistor, I (μA) is a value of electric current supplied to the vertical signal line, and ΔVFD(V) is a difference between a higher limit and a lower limit of a range possible with the first sensitivity of a potential of an input node of the first amplifying transistor and a potential of an input node of the second amplifying transistor.

14. A driving method for an imaging system having an image pickup device having a plurality of pixels and a vertical signal line, the plurality of pixel having a first pixel and a second pixel, the first pixel having a first photoelectric conversion unit and a first amplifying transistor, the second pixel having a second photoelectric conversion unit and a second amplifying transistor, and an amplification unit which is provided on a different semiconductor substrate from that of the image pickup device and amplifies a signal output from the image pickup device, the method comprising:

amplifying a signal output from the image pickup device with a first amplification factor and a second amplification factor lower than the first amplification factor by the amplification unit;

performing a first operation by the image pickup device if the amplification unit amplifies the signal output from the image pickup device with the first amplification factor; and performing a second operation without performing the first operation by the image pickup device if the amplification unit amplifies the signal output from the image pickup device with the second amplification factor, wherein the first operation is an operation in which a first signal and a second signal are mixed in the vertical signal line by at least partially overlapping a period when the first amplifying transistor outputs the first signal based on electric carriers generated by the first photoelectric conversion unit to the vertical signal line with a period when the second amplifying transistor outputs the second signal based on electric carriers generated by the second photoelectric conversion unit to the vertical signal line; and the second operation includes an operation in which the first and second photoelectric conversion units output a first number of signals based on electric carriers acquired by performing photoelectric conversion on incident light and includes an operation in which the image pickup device outputs a second number of signals by performing a process of the first number of signals, the second number being smaller than the first number.

15. The driving method for the imaging system according to claim 14, wherein the amplification unit has an AD conversion unit which converts a signal output from the image pickup device to a digital signal, and the amplification unit converts a signal output from the image pickup device to a digital signal with the first amplification factor and the second amplification factor.

16. The driving method for the imaging system according to claim 14, wherein a value of an evaluation index Z expressed by an expression below is equal to or higher than 2.5

$Z=I/\{(W/L)\times\Delta VFD^2\}$ where L is a channel length of each of the first amplifying transistor and the second amplifying transistor, W is a channel width of each of the first amplifying transistor and the second amplifying transistor, I (μA) is a value of electric current supplied to the vertical signal line, and $\Delta VFD(V)$ is a difference between a higher limit and a lower limit of a range possible with the first sensitivity of a potential of an input node of the first amplifying transistor and a potential of an input node of the second amplifying transistor.

17. An image pickup device comprising a plurality of pixels, a vertical signal line, a signal processing circuit, and a control unit, the plurality of pixels having a first pixel and a second pixel, the first pixel having a first photoelectric conversion unit and a first amplifying transistor, the second pixel having a second photoelectric conversion unit, and a second amplifying transistor, the signal processing circuit amplifying a signal output to the vertical signal line with one of a first amplification factor and a second amplification factor lower than the first amplification factor, the control unit causing the first pixel and the second pixel to perform a first operation if the signal processing circuit amplifies the signal output to the vertical signal line with the first amplification factor, the control unit causing the first pixel and the second pixel to perform a second operation without causing to perform the first operation if the signal processing circuit amplifies a signal output to the vertical signal line with the second amplification factor, wherein the first operation is an operation in which a first signal and a second signal are mixed in the vertical signal line by at least partially overlapping a period when the first amplifying transistor outputs the first signal based on electric carriers generated by the first photoelectric conversion unit to the vertical signal line with a period when the second amplifying transistor outputs the second signal based on electric carriers generated by the second photoelectric conversion unit to the vertical signal line; and the second operation includes an operation in which the first and second photoelectric conversion units output a first number of based on electric carriers acquired by performing photoelectric conversion on incident light, and includes an operation in which the image pickup device outputs a second number of signals by performing a process of the first number of signals, the second number being smaller than the first number.

18. An imaging system comprising the image pickup device according to claim 17, and a signal processing unit which generates an image by processing a signal output from the image pickup device.

19. An imaging system comprising an image pickup device having a plurality of pixels, a vertical signal line, a signal processing circuit and a control unit which controls the image pickup device, the plurality of pixels having a first pixel and a second pixel, the first pixel having a first photoelectric conversion unit and a first amplifying transistor, the second pixel having a second photoelectric conversion unit, and a second amplifying transistor, the signal processing circuit amplifying a signal output to the vertical signal line with one of a first amplification factor and a second amplification factor lower than the first amplification factor, the control unit causing the first pixel and the second pixel to perform a first operation if the signal processing circuit amplifies the signal output to the vertical signal line with the first amplification factor, the control unit causing the first pixel and the second pixel to perform a second operation without causing to perform the first operation if the signal processing circuit amplifies the signal output to the vertical signal line with the second amplification factor, wherein the first operation is an operation in which a first signal and a second signal are mixed in the vertical signal line by at least partially overlapping a period when the first amplifying transistor outputs the first signal based on electric carriers generated by the first photoelectric conversion unit to the vertical signal line with a period when the second amplifying transistor outputs the second signal based on electric carriers generated by the second photoelectric conversion unit to the vertical signal line; and the second operation is an operation in which the first and second photoelectric conversion units output a first number of signals based on electric carriers acquired by performing photoelectric conversion on incident light, and includes an operation in which the image pickup device outputs a second number of signals by performing a process of the first number of signals, the second number being smaller than the first number.

* * * * *